(12) United States Patent
Matsuura

(10) Patent No.: US 9,760,354 B2
(45) Date of Patent: Sep. 12, 2017

(54) INFORMATION PROCESSING APPARATUS AND COMPILING METHOD

(71) Applicant: FUJITSU LIMITED, Kawasaki-shi, Kanagawa (JP)

(72) Inventor: Takayuki Matsuura, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 45 days.

(21) Appl. No.: 15/070,048

(22) Filed: Mar. 15, 2016

(65) Prior Publication Data

US 2016/0321048 A1    Nov. 3, 2016

(30) Foreign Application Priority Data

Apr. 28, 2015   (JP) .................................. 2015-091855

(51) Int. Cl.
  *G06F 9/45*   (2006.01)
(52) U.S. Cl.
  CPC .......... *G06F 8/4443* (2013.01); *G06F 8/4442* (2013.01)
(58) Field of Classification Search
  CPC ........................................................ G06F 9/45
  USPC ................................................. 717/153–157
  See application file for complete search history.

(56) References Cited

U.S. PATENT DOCUMENTS

| | | | | |
|---|---|---|---|---|
| 6,292,940 B1* | 9/2001 | Sato | ....................... | G06F 8/4441 712/E9.083 |
| 6,367,071 B1* | 4/2002 | Cao | ......................... | G06F 8/443 712/E9.058 |
| 2005/0076172 A1* | 4/2005 | Caska | ................. | G06F 9/45516 711/1 |
| 2005/0193359 A1* | 9/2005 | Gupta | ................. | G06F 17/5045 716/104 |
| 2011/0238954 A1* | 9/2011 | Naito | .................. | G06F 15/7867 712/220 |
| 2014/0245274 A1* | 8/2014 | Inoue | .................... | G06F 8/4443 717/151 |

FOREIGN PATENT DOCUMENTS

| | | |
|---|---|---|
| JP | 05-120029 | 5/1993 |
| JP | 06-202875 | 7/1994 |
| JP | 2001-282546 | 10/2001 |

\* cited by examiner

*Primary Examiner* — Jae Jeon
(74) *Attorney, Agent, or Firm* — Fujitsu Patent Center

(57) ABSTRACT

A memory stores code including a plurality of functions and a plurality of function calls each calling one of the plurality of functions. A processor calculates, for each of the plurality of functions, a plurality of index values including a first index value indicating an iteration status of a loop in the function and a second index value indicating the code size of the function. The processor calculates, for each of the plurality of function calls, an evaluation value based on the plurality of index values that are calculated for the function called by the function call. The processor selects one or more of the plurality of function calls, based on the evaluation value, and inlines the selected function calls.

6 Claims, 21 Drawing Sheets

FIG. 11

SOURCE CODE 25

```
void func8(int a, int b) {
    int i;
    for (i=0; i<10; i++) {
        func4();
        func3(a);
    }
    func3(b);
}
```

INTERMEDIATE CODE 52

```
;Function:  "func8"
;move       "i" 0
;move       "@1" 10

;$label_loop
;callpe     "func4"()
;callpe     "func3"("a")
;add        "i" "i" 1
;bct        "i" $label_loop ;callpe     "func3"("b")
```

165a

| FUNCTION ID | 8 |
|---|---|
| LOOP COUNT | 10 |
| NUMBER OF SOURCE CODE LINES | 4 |
| NUMBER OF INTERMEDIATE CODE INSTRUCTIONS | 7 |
| USER DIRECTIVE FLAG | False |
| NUMBER OF FUNCTION CALLS | 3 |
| NUMBER OF NON-PIPELINED INSTRUCTIONS | 0 |

FIG. 12

CONTROL INFORMATION
STORAGE UNIT 143

EVALUATION CRITERIA TABLE 166

| ARCHITECTURE NAMA | CPU-X |
|---|---|
| L1 INSTRUCTION CACHE | 32 kByte |
| INSTRUCTION LENGTH | 8 Byte |
| LOOP COUNT | + 10*A*N |
| NUMBER OF SOURCE CODE LINES | + 10*A*N |
| NUMBER OF INTERMEDIATE CODE INSTRUCTIONS | + (100*A-N) |
| INNERMOST LOOP FLAG | True: +A, False: 0 |
| USER DIRECTIVE FLAG | True: +20*A, False: 0 |
| NUMBER OF FUNCTION CALLS | – A*N |
| NUMBER OF NON-PIPELINED INSTRUCTIONS | – A*N |

CONTROL INFORMATION
STORAGE UNIT

EVALUATION
VALUE TABLE     167

| FUNCTION CALL ID | EVALUATION VALUE |
|---|---|
| A | 10 |
| B | 30 |
| C | 50 |
| D | 40 |
| E | 100 |
| F | 20 |
| G | 60 |
| H | 70 |
| I | 30 |
| J | 90 |
| K | 30 |
| L | 20 |
| M | 10 |

INFORMATION PROCESSING APPARATUS AND COMPILING METHOD

CROSS-REFERENCE TO RELATED APPLICATION

This application is based upon and claims the benefit of priority of the prior Japanese Patent Application No. 2015-091855, filed on Apr. 28, 2015, the entire contents of which are incorporated herein by reference.

FIELD

The embodiments discussed herein are related to an information processing apparatus and a compiling method.

BACKGROUND

In software development, source code is often written in a high-level language easily understood by humans, and is converted into machine-readable object code by a compiler. When writing source code, a set of operations is defined as a function in order to increase the reusability. Thus, the function is used repeatedly by executing a function call.

However, if a processor simply executes a function call, overhead is incurred to save and replace the content such as the values of registers. That is, frequent execution of function calls might reduce the performance. Thus, some compilers perform inline expansion of function calls as a way of compiler optimization. Inline expansion of function calls is an optimization technique that replaces a function call instruction with instructions included in the called function, and thereby reduces the number of function calls in the object code. Inline expansion of function calls often improves the performance of object code.

However, in many cases, when function calls are inlined, the number of instructions in the calling program module increases. If the number of instructions increases, the instruction cache of the processor might not be able to store all the instructions of the program module. This might cause frequent replacement of instructions in the instruction cache, and result in a reduction in performance. Thus, there has been proposed an optimization method to be performed by a compiler. This optimization method estimates the object code size in the case where a function call is inlined, and inlines the function call only when the estimated object code size does not exceed the size of the instruction cache.

There has also been proposed a compiler that determines for each function call whether to perform inline expansion. The proposed compiler estimates, for a function call, the number of times the loop to which the function call belongs is executed. The compiler calculates a determination value of the function call, based on the estimated loop count, the object code size of the called function, and the properties of the target processor. When the calculated determination value is greater than a predetermined threshold, the compiler determines to inline the function call.

There has also been proposed a program conversion apparatus that selects a function to be subjected to optimization from a plurality of functions. The proposed program conversion apparatus counts, for each of a plurality of functions, instructions in the function that access variables. The program conversion apparatus selects a function with the highest count of instructions, and inlines a function call that calls the selected function.

See, for example, Japanese Laid-open Patent Publications No. 5-120029, No. 6-202875 and No. 2001-282546.

Among a plurality of function calls, there exist function calls whose inline expansion greatly improves the performance, and function calls whose inline expansion does not greatly improve the performance. Therefore, it is preferable to select and inline a function call whose inline expansion improves the performance as much as possible, under the constraints of the size of the instruction cache and the like. However, the proposed compiler described above is configured to determine for each function call whether to perform inline expansion, and is not configured to select a function call to be inlined, from a plurality of function calls. Further, the proposed program conversion apparatus described above is configured to inline a function call that calls a function with the greatest number of instructions involving access to a variable. That is, there is still room for improvement in terms of performance.

SUMMARY

According to one aspect, there is provided an information processing apparatus. The information processing apparatus includes: a memory configured to store code including a plurality of functions and a plurality of function calls, each of the plurality of function calls calling one of the plurality of functions; and a processor configured to perform a procedure including: calculating, for each of the plurality of functions included in the code, a plurality of index values including a first index value and a second index value, the first index value indicating an iteration status of a loop in the function, the second index value indicating a code size of the function; calculating, for each of the plurality of function calls included in the code, an evaluation value based on the plurality of index values that are calculated for the function called by the function call; and selecting one or more of the plurality of function calls, based on the evaluation value, and inlining the selected one or more function calls.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 11 illustrates an example of function index extraction;

FIG. 12 illustrates an example of an evaluation criteria table;

FIG. 13 illustrates an example of an evaluation value table;

DESCRIPTION OF EMBODIMENTS

Figure 1:
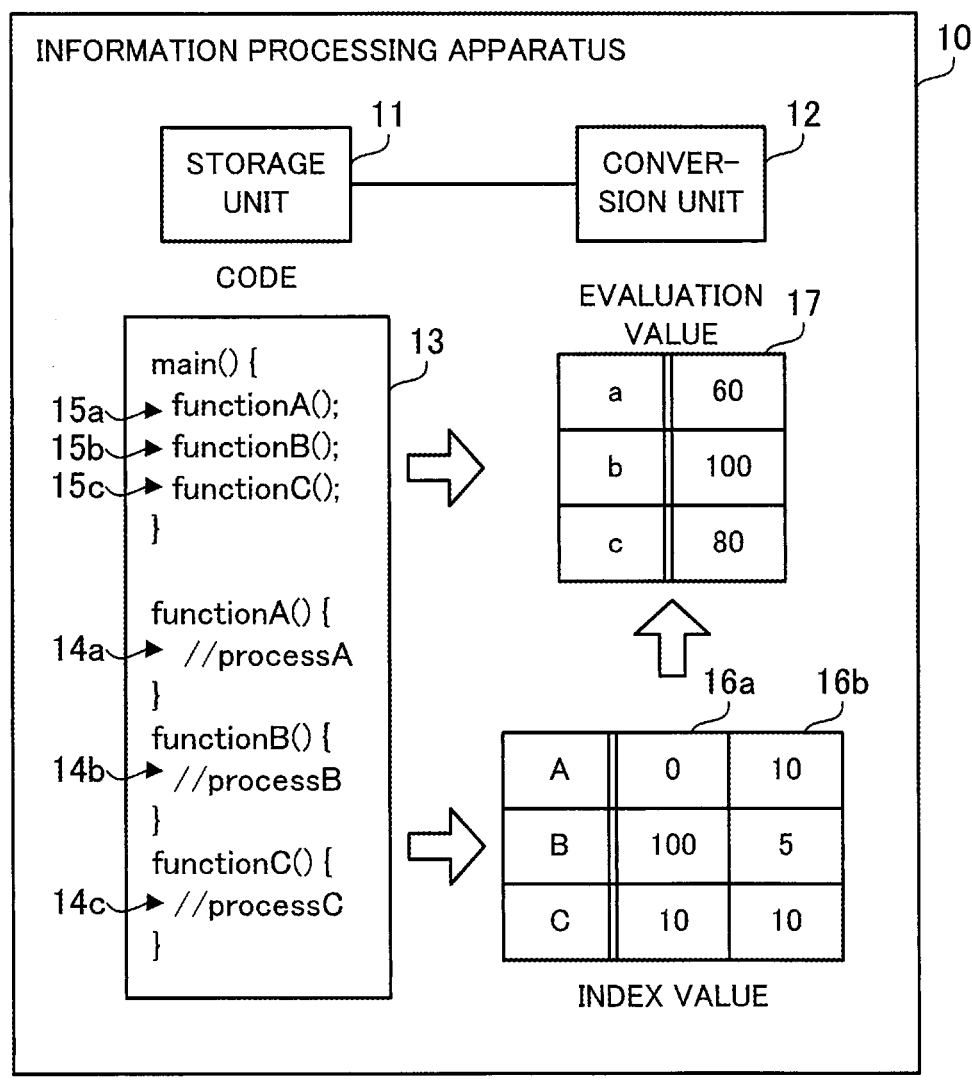
FIG. 1 illustrates an example of an information processing apparatus.

Several embodiments will be described below with reference to the accompanying drawings, wherein like reference numerals refer to like elements throughout.

(a) First Embodiment

The following describes a first embodiment.

FIG. 1 illustrates an example of an information processing apparatus 10.

The information processing apparatus 10 of the first embodiment compiles source code written in a high-level language so as to generate machine-readable object code. The information processing apparatus 10 may be referred to as a "compiling apparatus". The information processing apparatus 10 may be a computer. For example, the information processing apparatus 10 executes a compiler as software. The information processing apparatus 10 may be a terminal apparatus (such as a client computer and the like) that is operated by the user, or may be a server apparatus (such as a server computer and the like) that is accessed by a terminal apparatus.

The information processing apparatus 10 includes a storage unit 11 and a conversion unit 12. Examples of the storage unit 11 include volatile storage devices such as random access memory (RAM) and the like, and also include non-volatile storage devices such as hard disk drive (HDD), flash memory, and the like. Examples of the conversion unit 12 include processors such as central processing unit (CPU), digital signal processor (DSP), and the like. However, the conversion unit 12 may include an application specific electronic circuit such as application specific integrated circuit (ASIC), field programmable gate array (FPGA), and the like. The processor executes a program stored in a memory such as a RAM or the like. The processor executes a compiler program that compiles source code, for example. A set of multiple processors (a multiprocessor) may also be referred to as a "processor".

The storage unit 11 stores code 13. The code 13 is source code or intermediate code converted from source code. The code 13 includes a plurality of functions including functions 14a, 14b, and 14c. In the example of FIG. 1, the function 14a executes a process A when called; the function 14b executes a process B when called; and the function 14c executes a process C when called. The code 13 also includes a plurality of function calls including function calls 15a, 15b, and 15c. Each function call calls a function. In the example of FIG. 1, the function call 15a calls the function 14a; the function call 15b calls the function 14b; and the function call 15c calls the function 14c.

The conversion unit 12 calculates, for each function in the code 13, a plurality of index values including an index value 16a (a first index value) and an index value 16b (a second index value). The index value 16a indicates the iteration status of a loop in the function (for example, the loop count). The index value 16b indicates the code size of the function (for example, the number of lines of the source code, the number of instructions in the intermediate code, or the like).

The plurality of index values calculated by the conversion unit 12 may further include at least one of a third index value, a fourth index value, and a fifth index value. The third index value indicates whether additional information indicating inline expansion of the function is added. The additional information is added to the source code by the user, for example. The fourth index value indicates the number of other function calls included in the function. The fifth index value indicates the number of instructions that are not pipelined, among instructions included in the function. The type of instructions that are not pipelined depends on the target processor. Examples of such include single instruction multiple data (SIMD) instructions and the like.

The conversion unit 12 calculates an evaluation value 17 for each function call in the code 13. The evaluation value 17 uses the above-described plurality of index values that are calculated for the called function. For example, the conversion unit 12 calculates the evaluation value 17 by weighting the index values 16a and 16b with respective predetermined weights, and adding together the weighted index values 16a and 16b. The weight may be changed in accordance with the target processor. In the example of FIG. 1, the evaluation value of the function call 15a is calculated based on the index values of the function 14a. The evaluation value of the function call 15b is calculated based on the index values of the function 14b. The evaluation value of the function call 15c is calculated based on the index values of the function 14c.

In this step, the conversion unit 12 may calculate another index value for a module including the function call (for example, a function including the function call), and calculate the evaluation value 17 based on the other evaluation value in addition to the index values of the called function. The other evaluation value may be a sixth index value, a seventh index value, or the like, for example. The sixth index value indicates the iteration status of a loop to which the function call belongs (for example, the loop count). The seventh index value indicates the number of instructions that are not pipelined, among instructions included in the module to which the function call belongs.

The conversion unit 12 selects one or more of the plurality of function calls, based on the evaluation value 17, and inlines the selected function calls. That is, the conversion unit 12 replaces the instruction of each selected function call with instructions included in the called function. Function calls with higher evaluation values 17 are preferentially selected. Note that the selection is performed under the condition that the code size of each module after inline expansion does not exceed the size of the instruction cache (for example, Layer 1 (L1) instruction cache) of the target processor.

In the example of FIG. 1, the function calls 15a, 15b, and 15c are included in the main function. The evaluation value of the function call 15a is "60"; the evaluation value of the function call 15b is "100"; and the evaluation value of the function call 15c is "80". In this case, from the function calls 15a, 15b, and 15c, the function call 15b is preferentially selected, and then the function call 15c is selected, under the condition that the code size of the main function does not exceed the size of the instruction cache. Thus, the function calls 15b and 15c are inlined, while the function call 15a at the top is not likely to be inlined.

According to the information processing apparatus 10 of the first embodiment, for each of the functions 14a, 14b, and 14c, a plurality of index values including the index value 16a indicating the iteration status of a loop in the function and the index value 16b indicating the code size of the function are calculated. For each of the function calls 15a, 15b, and 15c, the evaluation value 17 is calculated based on the plurality of index values that are calculated for the called function. Then, one or more of the plurality of function calls 15a, 15b, and 15c are selected based on the evaluation value 17, and are inlined.

Accordingly, even when only one or more function calls are inlined due to the constraints of the size of the instruction cache or the like, it is possible to preferentially inline function calls whose inline expansion greatly improves the performance of the object code. That is, it is possible to inline appropriate function calls in terms of performance. Further, the effect of improving the performance does not have to be directly evaluated for every combination of function calls. Therefore, it is possible to reduce the processing load for optimizing compilation and thus to reduce the compilation time.

(b) Second Embodiment

The following describes a second embodiment.

A compiling apparatus 100 of the second embodiment compiles source code written in a high-level language so as to generate machine-readable object code. The compiling apparatus 100 may be a terminal apparatus that is operated by the user, or may be a server apparatus that is accessed by a terminal apparatus. The compiling apparatus 100 is implemented by a computer, for example. In this case, the compiling apparatus 100 executes a compiler and a linker as software.

Figure 2:
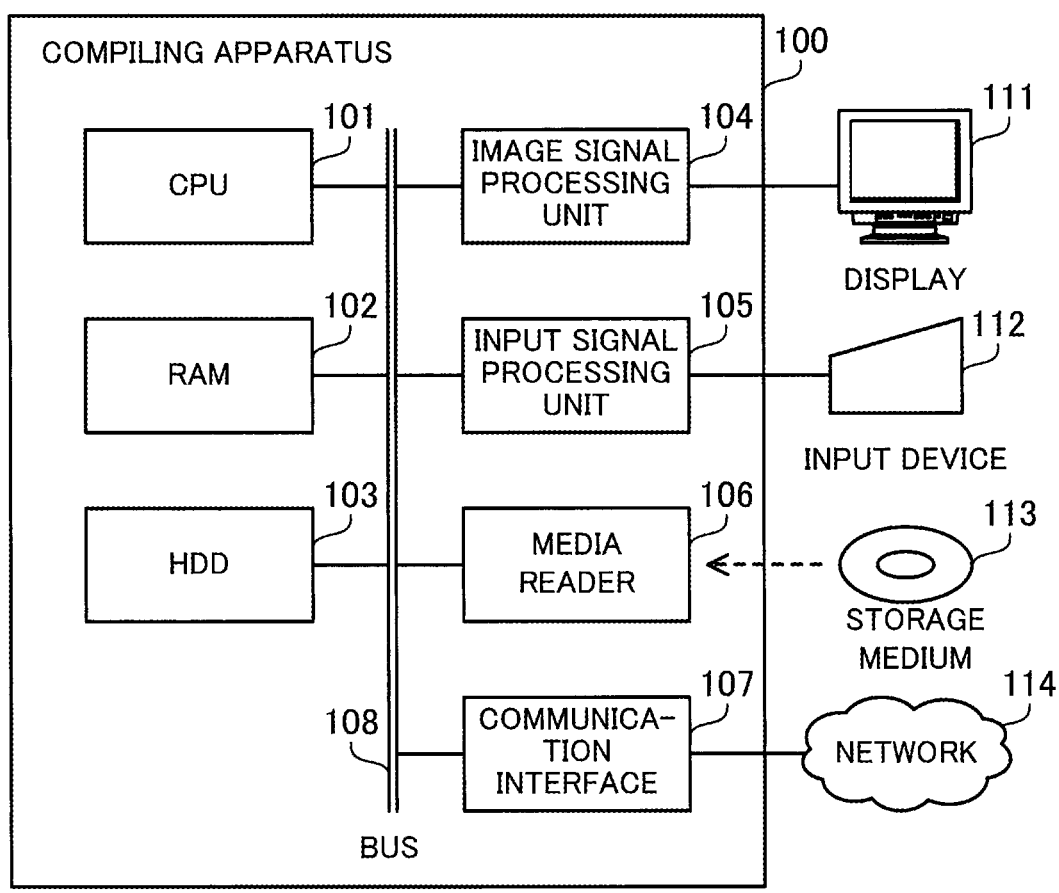
FIG. 2 is a block diagram illustrating exemplary hardware of a compiling apparatus.

FIG. 2 is a block diagram illustrating exemplary hardware of the compiling apparatus 100.

The compiling apparatus 100 includes a CPU 101, a RAM 102, an HDD 103, an image signal processing unit 104, an input signal processing unit 105, a media reader 106, and a communication interface 107. These units are connected to a bus 108.

The CPU 101 is a processor including an arithmetic circuit that executes instructions of a program. The CPU 101 loads at least part of a program and data stored in the HDD 103 into the RAM 102, and executes the program. Note that the CPU 101 may include multiple processor cores, and the compiling apparatus 100 may include multiple processors. Thus, processes described below may be executed in parallel by using multiple processors or processor cores. A set of multiple processors (a multiprocessor) may be referred to as a "processor".

The RAM 102 is a volatile semiconductor memory that temporarily stores a program executed by the CPU 101 and data used for processing by the CPU 101. The compiling apparatus 100 may include other types of memories than a RAM, and may include a plurality of memories.

The HDD 103 is a non-volatile storage device that stores programs of software (such as an operation system (OS), middleware, application software, and the like) and data. The programs include a compiler program and a linker program. The compiling apparatus 100 may include other types of storage devices such as a flash memory, a solid state drive (SSD), and the like, and may include a plurality of non-volatile storage devices.

The image signal processing unit 104 outputs an image to a display 111 connected to the compiling apparatus 100, in accordance with an instruction from the CPU 101. Examples of the display 111 include cathode ray tube (CRT) displays, liquid crystal displays (LCDs), plasma display panels (PDPs), organic electro-luminescence (OEL) displays, and the like.

The input signal processing unit 105 obtains an input signal from an input device 112 connected to the compiling apparatus 100, and outputs the input signal to the CPU 101. Examples of the input device 112 include pointing devices (such as a mouse, a touch panel, a touch pad, a trackball, and the like), a keyboard, a remote controller, a button switch, and the like. A plurality of types of input devices may be connected to the compiling apparatus 100.

The media reader 106 is a reading device that reads a program and data stored in a storage medium 113. Examples of the storage medium 113 include magnetic discs (such as flexible disk (FD), HDD, and the like), optical disc (such as compact disc (CD), digital versatile disc (DVD), and the like), magneto-optical discs (MOs), semiconductor memories, and the like. The media reader 106 reads, for example, a program and data from the storage medium 113, and stores the read program and data in the RAM 102 or the HDD 103.

The communication interface 107 is connected to a network 114, and is an interface that communicates with another computer via the network 114. The communication interface 107 may be a wired communication interface connected to a communication apparatus such as a switch with a cable, or may be a radio communication interface connected to a base station via a radio link.

The compiling apparatus 100 does not have to include the media reader 106. If the compiling apparatus 100 is controllable from a terminal apparatus operated by the user, the compiling apparatus 100 does not have to include the image signal processing unit 104 or the input signal processing unit 105. Further, the display 111 and the input device 112 may be integrally formed with the housing of the compiling apparatus 100.

Figure 3:
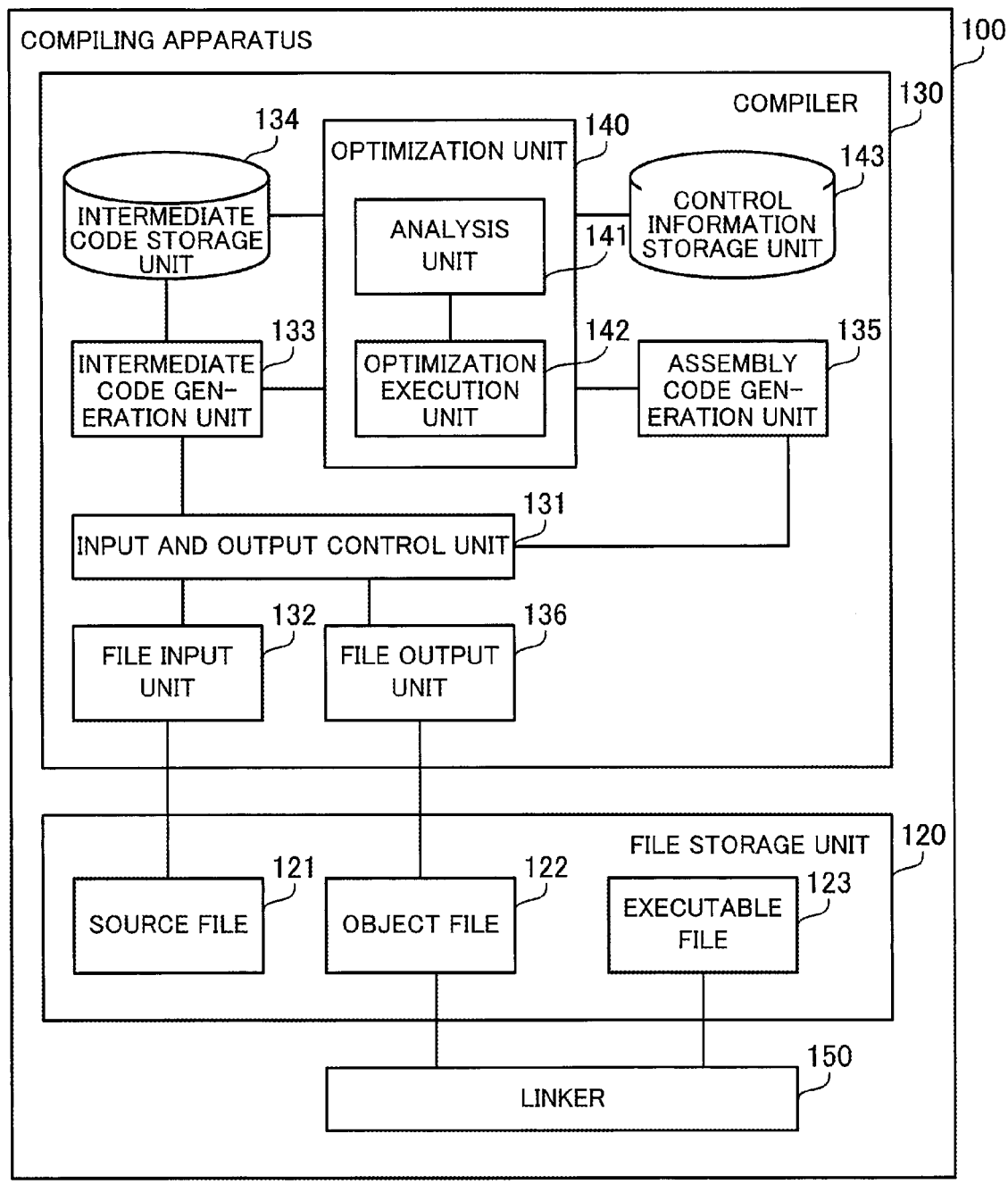
FIG. 3 is a block diagram illustrating exemplary functions of the compiling apparatus.

FIG. 3 is a block diagram illustrating exemplary functions of the compiling apparatus 100.

The compiling apparatus 100 includes a file storage unit 120, a compiler 130, and a linker 150. The file storage unit 120 is implemented as a storage area reserved in the RAM 102 or the HDD 103, for example. The compiler 130 and the linker 150 are implemented as modules of programs (a compiler program and a linker program) executed by the CPU 101, for example. Some or all of the functions of the compiler 130 and the linker 150 may be implemented as electronic circuits instead of as software.

The file storage unit 120 stores a source file 121, an object file 122, and an executable file 123. The source file 121 includes source code written in a high-level language such as C++ and the like. The object file 122 includes machine-readable object code. The executable file 123 is in a format executable by the target processor. Note that the executable file 123 may be executed by the CPU 101, another CPU of the compiling apparatus 100, or a CPU of a computer other than the compiling apparatus 100.

The compiler 130 reads the source file 121 from the file storage unit 120, converts source code into object code, and stores the object file 122 in the file storage unit 120. The compiler 130 includes an input and output control unit 131, a file input unit 132, an intermediate code generation unit 133, an intermediate code storage unit 134, an assembly code generation unit 135, a file output unit 136, an optimization unit 140, and a control information storage unit 143.

The input and output control unit 131 selects an input and output method corresponding to the type of files, and controls the file input unit 132 and the file output unit 136. The file input unit 132 opens the source file 121, and reads the source code from the source file 121, in accordance with an instruction from the input and output control unit 131. The intermediate code generation unit 133 analyzes the source code read by the file input unit 132, converts the source code into intermediate code written in an intermediate language, which is used in the compiler 130, and stores the intermediate code in the intermediate code storage unit 134. The analysis of source code includes lexical analysis, syntactic analysis, semantic analysis, and so on. The intermediate code storage unit 134 is a storage area reserved in the RAM 102, and stores the intermediate code.

The assembly code generation unit 135 converts the intermediate code optimized by the optimization unit 140 into assembly code written in an assembly language, which is a low-level language. The file output unit 136 generates an object file 122 in accordance with an instruction from the input and output control unit 131. Then, the file output unit 136 converts the assembly code generated by the assembly code generation unit 135 into object code, and writes the object code to the object file 122.

The optimization unit 140 optimizes the intermediate code stored in the intermediate code storage unit 134 in order to improve the execution speed. The optimization unit 140 includes an analysis unit 141 and an optimization execution unit 142. The analysis unit 141 analyzes intermediate code so as to determine an optimization method. The optimization method determined by the analysis unit 141 includes inline expansion of function calls, which replaces a function call instruction with instructions included in the called function and thereby reduces the number of function calls. The optimization execution unit 142 optimizes the intermediate code with the optimization method selected by the analysis unit 141. Optimization performed by the optimization execution unit 142 includes inline expansion.

The control information storage unit 143 is a storage area reserved in the RAM 102 or the HDD 103, and stores various types of control information that is generated or referred to by the optimization unit 140 during an optimization process. The details of the control information will be described below.

The linker 150 reads the object file 122 from the file storage unit 120, analyzes the object code, and detects other object files and libraries that are referred to. Then, the linker 150 links the object file 122 with the detected other object files and libraries so as to generate the executable file 123. Note that the functions of the linker 150 may be integrated into the compiler 130.

The following describes inline expansion of function calls.

Figure 4:
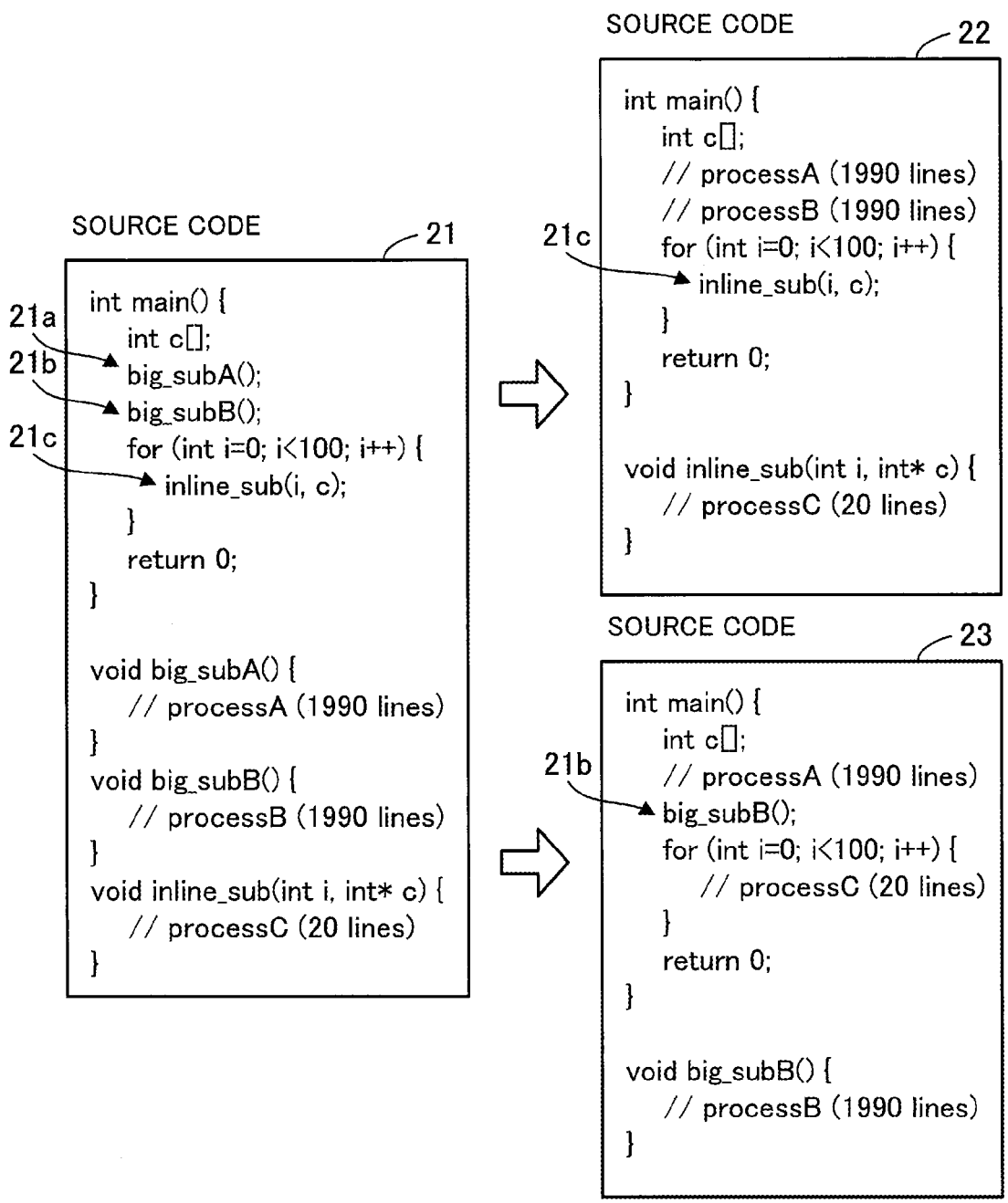
FIG. 4 illustrates an example of inline expansion.

FIG. 4 illustrates an example of inline expansion.

For simplicity of explanation, inline expansion of function calls at the source code level will be explained. In reality, however, the compiling apparatus 100 performs inline expansion of function calls in intermediate code corresponding to the source code illustrated in FIG. 4.

Source code 21 is an example of source code included in the source file 121. The source code 21 includes a function main, a function big_subA, a function big_subB, and a function inline_sub. In the function big_subA, a process A is defined by 1,990 lines of statements. In the function big_subB, a process B is defined by 1,990 lines of statements. In the function inline_sub, a process C is defined by 20 lines of statements. The function main includes a function call 21a that calls the function big_subA, a function call 21b that calls the function big_subB, and a function call 21c that calls the function inline_sub. The function call 21c is inside a loop that iterates 100 times. The function calls 21a and 21b are outside the loop.

In the following, it is assumed that inline expansion optimization is performed for the source code 21. Note that, due to the constraints of the size of the L1 instruction cache, the optimization is performed under the condition that the number of lines of the function main does not exceed 4,000 lines. The term "the number of lines" as used herein indicates the number of actual statements that end in a semicolon. Thus, the number of lines of the function main in the source code 21 in FIG. 4 is 5. There are the following two methods for inline expansion.

The first method is one that inlines function calls in order of nearest to the top of the source code 21. According to the first method, the source code 21 is converted into source code 22. More specifically, the function call 21a is first selected. If the function call 21a is inlined, the function main will have 1,994 lines. Accordingly, the selected function call 21a is inlined. Then, the function call 21b is selected. If the function call 21b is inlined, the function main will have 3,983 lines. Accordingly, the selected function call 21b is inlined. Then, the function call 21c is selected. If the function call 21c is inlined, the function main will have 4,002 lines. Accordingly, the optimization ends without inlining the selected function call 21c.

However, according to the first method, although the function calls 21a and 21b that are executed only once are inlined, the function call 21c that is executed 100 times is not inlined. That is, there is room for improving object code corresponding to the source code 22. Thus, the second method evaluates the function calls 21a, 21b, and 21c, and preferentially selects function calls with higher evaluation values. In this example, the function calls 21c, 21a, and 21b are selected in this order based on the evaluation values.

According to the second method, the source code 21 is converted into source code 23. More specifically, the function call 21c is first selected. If the function call 21c is inlined, the function main will have 24 lines. Accordingly, the selected function call 21c is inlined. Then, the function call 21a is selected. If the function call 21a is inlined, the function main will have 2,023 lines. Accordingly, the selected function call 21a is inlined. Then, the function call 21b is selected. If the function call 21b is inlined, the function main will have 4,002 lines. Accordingly, the optimization ends without inlining the selected function call 21b.

Object code corresponding to the source code 23 generated by the second method has less function calls than the object code corresponding to the source code 22 generated by the first method. This indicates that the performance is improved.

Figure 5:
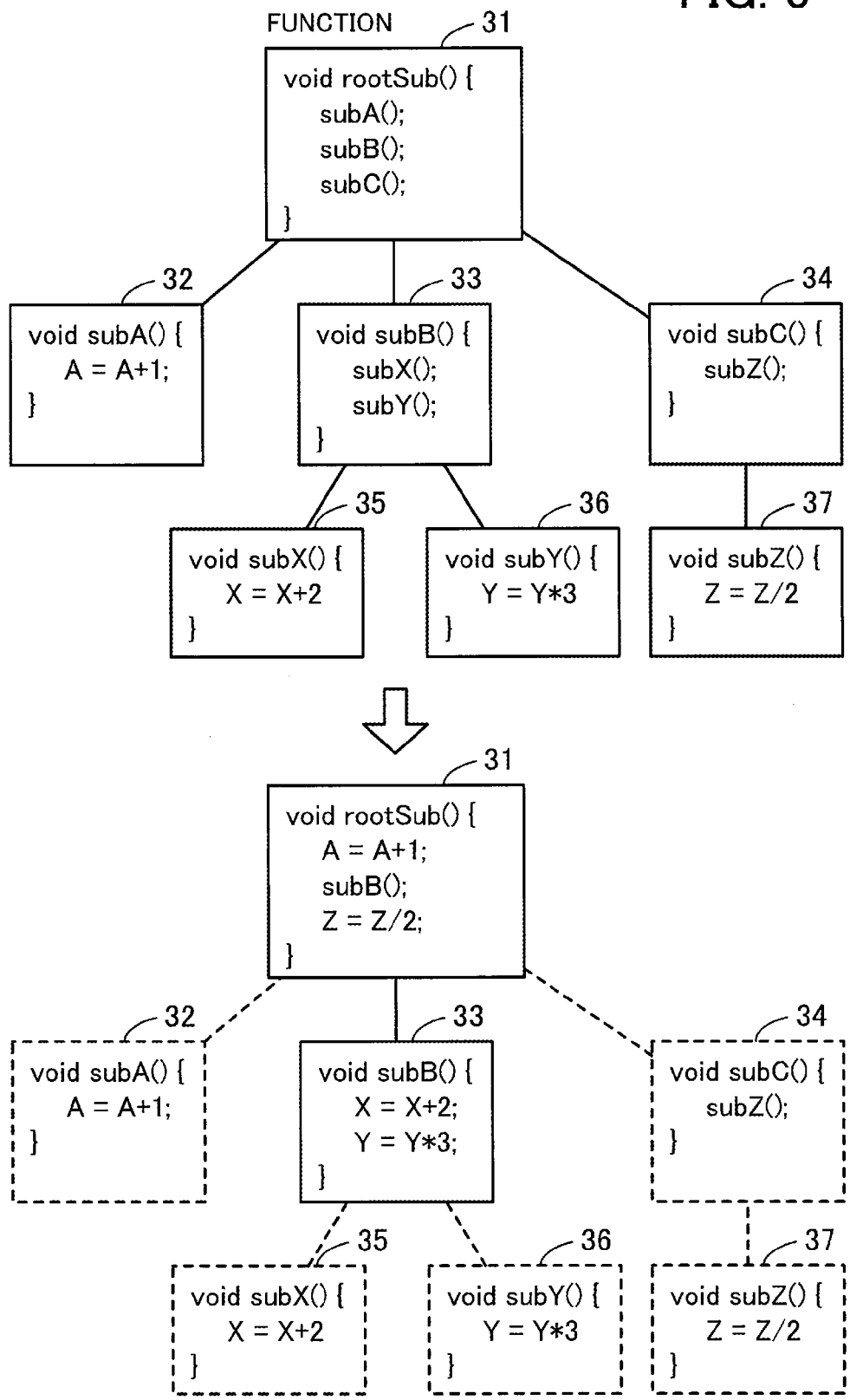
FIG. 5 illustrates an example of inline expansion of hierarchical function calls.

FIG. 5 illustrates an example of inline expansion of hierarchical function calls.

The following describes a case where some of hierarchical function calls are inlined. A function 31 (rootSub) includes a function call that calls a function (subA), a function call that calls a function 33 (subB), and a function call that calls a function 34 (subC). The function 32 includes a statement "A=A+1". The function includes a function call that calls a function 35 (subX) and a function call that calls a function 36 (subY). The function 34 includes a function call that calls a function 37 (subZ). The function 35 includes a statement "X=X+2". The function 36 includes a statement "Y=Y*3". The function 37 includes a statement "Z=Z/2".

It is assumed here that the function call that calls the function 32 from the function 31 and the function call that calls the function 34 from the function 31 are inlined. It is also assumed that the function call that calls the function 35 from the function 33, the function call that calls the function 36 from the function 33, and the function call that calls the function 37 from the function 34 are inlined. On the other hand, it is assumed that the function call that calls the function 33 from the function 31 is not inlined.

In this case, the statement "X=X+2" of the function 35 is inserted into the function 33, and the statement "Y=Y*3" of the function 36 is inserted into the function 33. Further, the statement "Z=Z/2" of the function 37 is inserted into the function 34. Further, the statement "A=A+1" of the function 32 is inserted into the function 31. Further, the statement "Z=Z/2" inserted in the function 34 is inserted into the function 31. As the result, the function 31 includes the statement "A=A+1", the function call to the function 33, and the statement "Z=Z/2". The function 33 includes the statement "X=X+2" and the statement "Y=Y*3". Note that in the case where the functions 32, 34, 35, 36, and 37 may be removed from the object code if not referenced by any other function.

The following describes the data structure used for evaluation of each function call.

Figure 6:
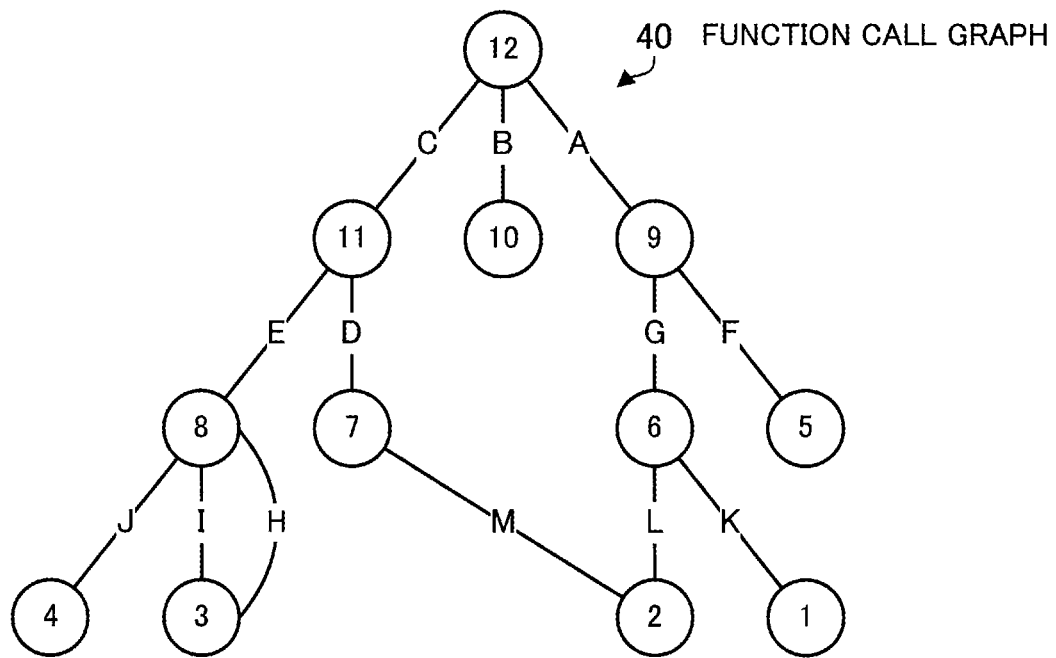
FIG. 6 illustrates an example of a function call graph.

FIG. 6 illustrates an example of a function call graph 40.

The analysis unit 141 analyzes intermediate code stored in the intermediate code storage unit 134, and thereby generates the function call graph 40. The function call graph 40 includes nodes representing functions and links representing function calls. The function call graph is a graph representing hierarchical function calls, and has a tree structure or a structure similar to a tree. More specifically, the function call graph 40 is the same as a tree in having a single root node. However, the function call graph 40 is different from a tree in that multiple links may be created between the same two nodes, and in that different parent nodes may be connected to the same child node.

For example, the function call graph 40 includes nodes corresponding to functions #1 through #12 and links corresponding to function calls #A through #K. Note that #1 through #12 are IDs assigned to the functions in the intermediate code by the analysis unit 141. Further, #A through #M are IDs assigned to the function calls in the intermediate code by the analysis unit 141.

The function #12 includes the function call #A that calls the function #9, the function call #B that calls the function #10, and the function call #C that calls the function #11. The function #11 includes the function call #D that calls the function #7 and the function call #E that calls the function #8. The function #9 includes the function call #F that calls the function #5 and the function call #G that calls the function #6. The function #8 includes the function call #H that calls the function #3, the function call #I that calls the function #3, and the function call #J that calls the function #4. The function #6 includes the function call #K that calls the function #1 and the function call #L that calls the function #2. The function #7 includes the function call #M that calls the function #2.

As will be described below, the evaluation values of the function calls #A through #M may be calculated by scanning all the functions #1 through #12 twice in accordance with the function call graph 40. The first scan is for scanning the functions in breadth-first order from the root to the leaves of the function call graph 40, and may be regarded as a forward function scan. More specifically, in the first scan, the analysis unit 141 scans the functions #1 through #12 in the order of the functions #12, #11, #10, #9, #8, #7, #6, #5, #4, #3, #2, and #1. The second scan is for scanning the functions in reverse order to the order of the first scan, and may be regarded as a backward function scan. More specifically, in the second scan, the analysis unit 141 scans the functions #1 through #12 in the order of the functions #1, #2, #3, #4, #5, #6, #7, #8, #9, #10, #11, and #12.

Figure 7:
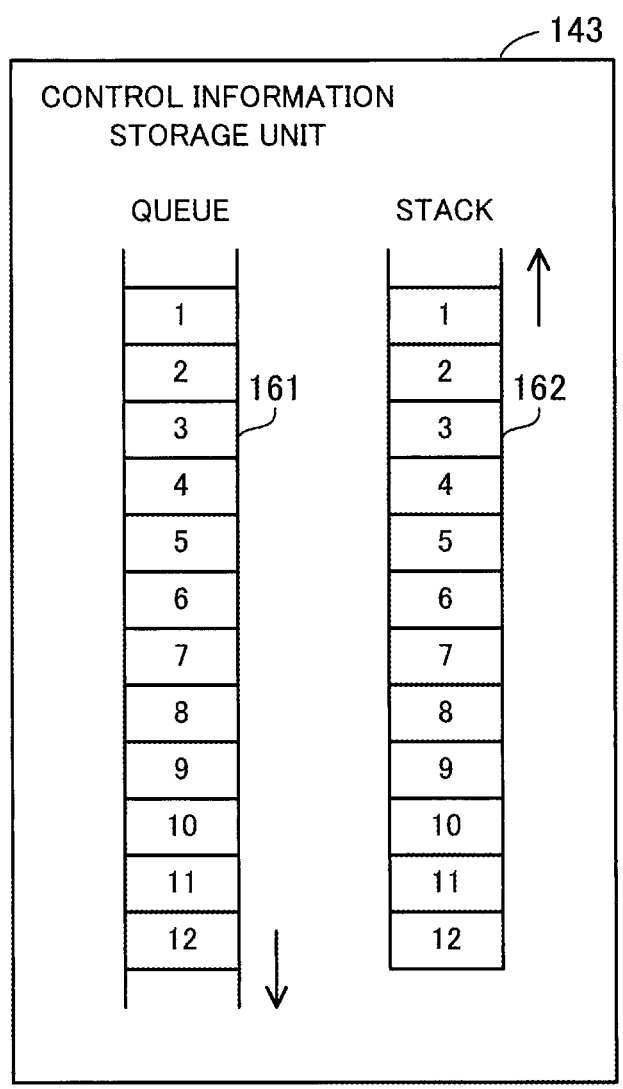
FIG. 7 illustrates an example of a queue and a stack.

FIG. 7 illustrates an example of a queue 161 and a stack 162.

The queue 161 and the stack 162 are storage areas provided in the control information storage unit 143. Each of the queue 161 and the stack 162 stores function IDs that identify the functions #1 through #12. The queue 161 has a First In First Out (FIFO) data structure, and allows the first inserted function ID to be extracted first. The stack 162 has a Last In First Out (LIFO) data structure, and allows the last inserted function ID to be extracted first.

In the forward function scan described above, the analysis unit 141 inserts the function ID of the detected function into the queue 161 and the stack 162. The function ID inserted in the queue 161 is used in the subsequent steps of the forward function scan. In the forward function scan, the analysis unit 141 extracts a function ID from the end of the queue 161 (from the opposite side of the entrance). The function ID inserted in the stack 162 is used in the second scan (backward function scan) described above. In the backward function scan, the analysis unit 141 extracts a function ID from the top (entrance) of the stack 162.

Figure 8:
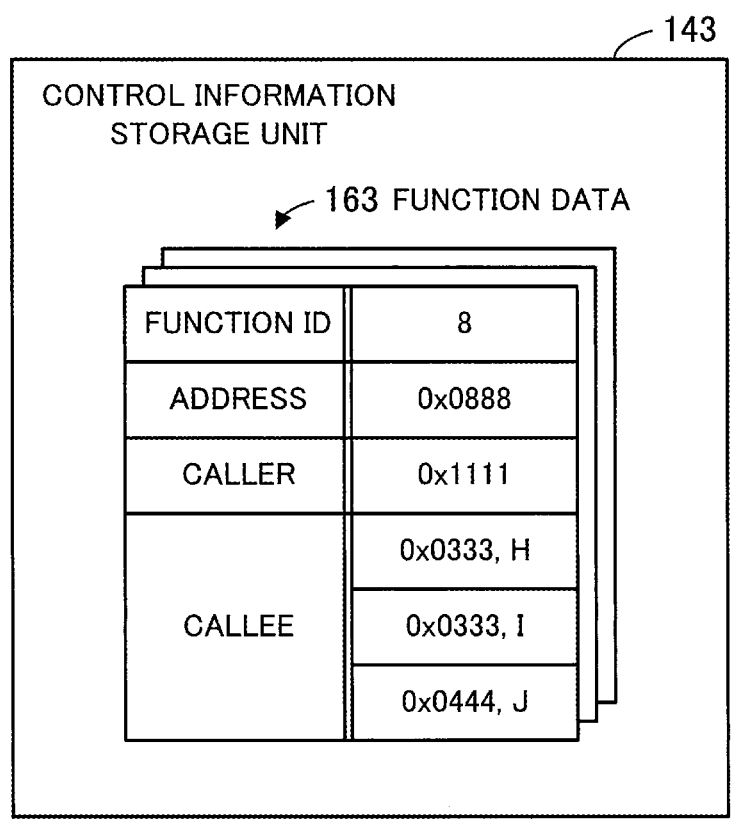
FIG. 8 illustrates an example of function data.

FIG. 8 illustrates an example of function data 163.

Upon inserting a function ID into the queue 161 and the stack 162, the analysis unit 141 generates the function data 163. The function data 163 is stored in the control information storage unit 143. The function data 163 includes records corresponding to the respective functions. Each record includes the following items: function ID, address, caller, and callee.

The item "address" indicates the start position of the function. The item "caller" indicates the address of another function that calls the function. The item "caller" may include addresses of a plurality of other functions. However, in the record corresponding to the function at the root (the function #12 in the example of FIG. 6), the item "caller" is empty. The item "callee" indicates the address of another function that is called by the function, and a function call ID that identifies the function call. The item "callee" may include addresses of a plurality of other functions and a plurality of function call IDs. However, in the records corresponding to the functions at the leaf nodes (the functions #1, #2, #3, #4, #5, and #10 in the example of FIG. 6), the item "callee" is empty.

For example, a record corresponding to the function #8 includes a function ID "8", an address "0x0888", a caller "0x1111", and callees "0x0333, H", "0x0333, I", and "0x0444, J". Note that "0x1111" is the address of the function #11; "0x0333" is the address of the function #3; and "0x0444" is the address of the function #4.

Figure 9:
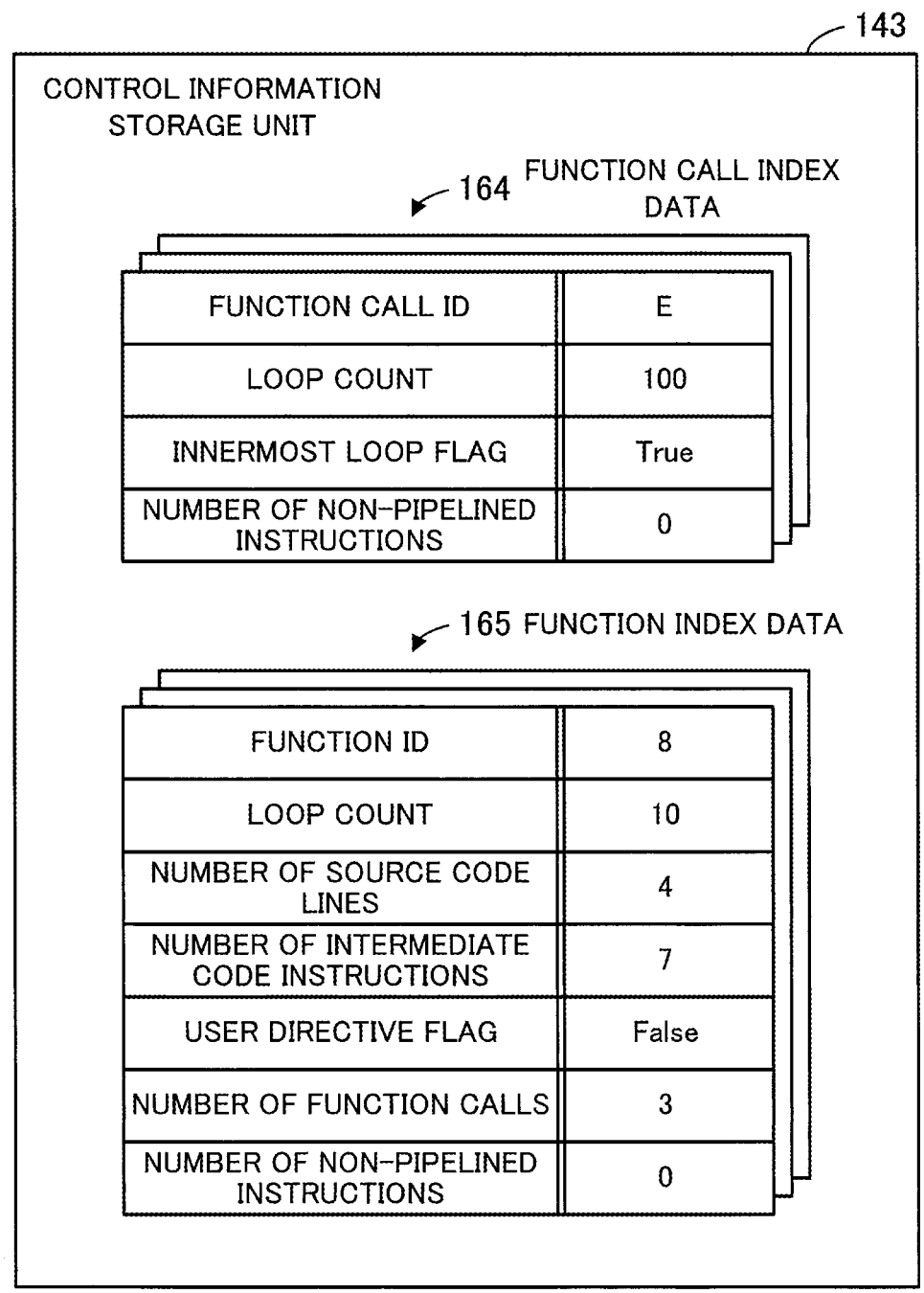
FIG. 9 illustrates an example of function call index data and function index data.

FIG. 9 illustrates an example of function call index data 164 and function index data 165.

In the forward function scan, the analysis unit 141 extracts index values for each function call from the intermediate code, and generates the function call index data 164 including the extracted index values. The function call index data 164 is stored in the control information storage unit 143. The function call index data 164 includes records corresponding to the respective function calls. Each record includes the following items: function call ID, loop count, innermost loop flag, and number of non-pipelined instructions.

The item "loop count" indicates how many times the loop to which the function call belongs iterates. If there is no loop in the block (a unit of compilation) to which the function call belongs, the loop count is set to 0. In the case where the iteration count is not known from the intermediate code (for example, in the case where the iteration count is determined dynamically during execution), the loop count may be set to a predetermined value such as 0 or other values.

The item "innermost loop flag" indicates whether the function call belongs to the innermost loop (whether there is no loop in the loop to which the function call belongs). If there is no loop in the block to which the function call belongs or if there is no loop in the loop to which the function call belongs, the innermost loop flag is set to True. The item "number of non-pipelined instructions" indicates how many instructions are not pipelined, among instructions included in the block to which the function call belongs. The type of instructions that are not pipelined depends on the architecture of the target processor. An example non-pipelined instructions is a SIMD instruction.

In the backward function scan, the analysis unit 141 extracts index values for each function from the intermediate code, and generates the function index data 165 including the extracted index values. The function index data 165 is stored in the control information storage unit 143. The function index data 165 includes records corresponding to the respective functions. Each record includes the following items: function ID, loop count, number of source code lines, number of intermediate code instructions, user directive flag, number of function calls, and number of non-pipelined instructions.

The item "loop count" indicates how many times the loop included in the function iterates. If there is no loop in the function, the loop count is set to 0. In the case where the iteration count is not known from the intermediate code (for example, in the case where the iteration count is determined dynamically during execution), the loop count may be set to a predetermined value such as 0 or other values. The item "number of source code lines" indicates how many lines of the source code define the function. Note that "the number of lines" includes only the number of lines of actual statements, and does not include the number of lines of function names, brackets, and comments. The item "number of intermediate code instructions" indicates the number of instructions in the intermediate code defining the function.

The user directive flag indicates whether a directive for inline expansion of the function is added. The directive for inline expansion is written in the source code by the user. If a directive for inline expansion is added, the user directive flag is set to True. The item "number of function calls" indicates how many function call instructions are included in the function. The item "number of non-pipelined instructions" indicates how many instructions are not pipelined, among instructions included in the function.

Figure 10:
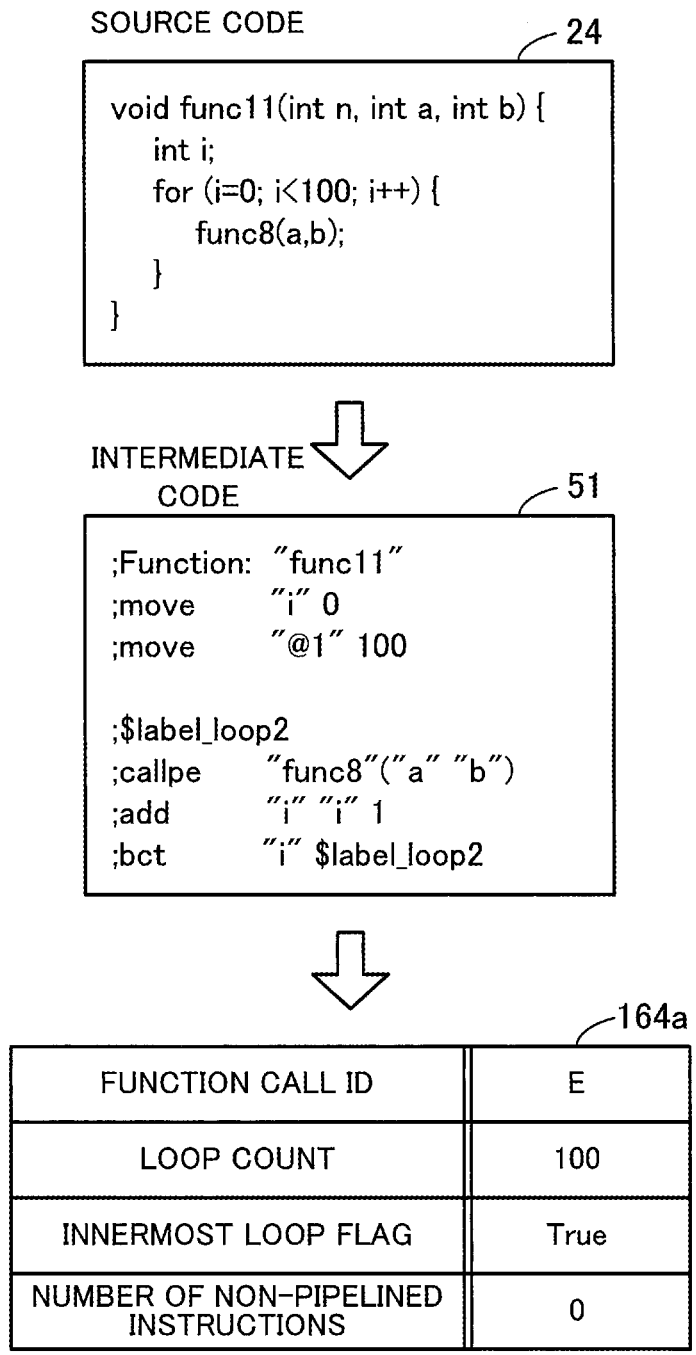
FIG. 10 illustrates an example of function call index extraction.

FIG. 10 illustrates an example of function call index extraction.

Source code 24 is an example of source code included in the source file 121. The source code 24 includes the function #11 (represented as "func11"). The function #11 includes the function call #E that calls the function #8 (represented as "func8"). The function call #E belongs to a loop that iterates 100 times. That is, the function #8 is repeatedly called 100 times. The source code 24 is converted into intermediate code 51 by the intermediate code generation unit 133. The intermediate code 51 is stored in the intermediate code storage unit 134.

In this case, in a forward function scan, the analysis unit 141 generates a record 164a corresponding to the function call #E, and adds the record 164a to the function call index data 164. The record 164a includes a function call ID "E". Further, since the loop to which the function call #E belongs iterates 100 times, the record 164a includes the loop count "100". The loop count may be extracted from the intermediate code 51 by detecting an assignment statement for the loop variable. Further, since the function call #E belongs to the innermost loop, the record 164a includes an innermost loop flag "True". Further, since the function #11 does not include any instruction that is not pipelined, the record 164a includes the number of non-pipelined instructions "0".

FIG. 11 illustrates an example of function index extraction.

Source code 25 is an example of source code included in the source file 121. The source code 25 includes the function #8 (represented as "func8"). The function #8 includes the function call #J that calls the function #4 (represented as "func4"), the function call #I that calls the function #3 (represented as "func3"), and the function call #H that calls the function #3. The function calls #J and #I belong to a loop that iterates 10 times. That is, the functions #3 and #4 are called alternately 10 times each. The source code 25 is converted into intermediate code 52 by the intermediate code generation unit 133. The intermediate code 51 is stored in the intermediate code storage unit 134.

In this case, in a backward function scan, the analysis unit 141 generates a record 165a corresponding to the function #8, and adds the record 165a to the function index data 165. The record 165a includes the function ID "8". Further, since the function #8 includes a loop that iterates 10 times, the record 165a includes the loop count "10". The loop count may be extracted from the intermediate code 52 by detecting an assignment statement for the loop variable. Further, since the source code 25 includes four statements that end in a semicolon, the record 165a includes the number of source code lines "4". Further, since the intermediate code 52 includes two "move" instructions, three "callpe" instructions, one "add" instruction, and one "bct" instruction, the record 165a includes the number of intermediate code instructions "7".

Further, since a directive for inline expansion is not added to the source code 25, the record 165a includes a user directive flag "False". Further, since the function #8 includes three function call instructions ("callpe" instructions), the record 165a includes the number of function calls "3". Further, since the function #8 does not include any instruction that is not pipelined, the record 165a includes the number of non-pipelined instructions "0".

FIG. 12 illustrates an example of an evaluation criteria table 166.

The evaluation criteria table 166 indicates a calculation method for calculating an evaluation value of each function call from the function call index data 164 and the function index data 165. The evaluation criteria table 166 is prepared in advance for each processor architecture, and is stored in the control information storage unit 143. The reason why the evaluation criteria table 166 is prepared for each architecture is because the instruction cache size and the instruction length vary from one architecture to another, and therefore the criteria for determining whether the performance improves depend on the architecture. The evaluation criteria table 166 includes the following items: architecture name, L1 instruction cache, instruction length, loop count, number of source code lines, number of intermediate code instructions, innermost loop flag, user directive flag, number of function calls, and number of non-pipelined instructions.

The item "architecture name" indicates the name of the processor architecture, that is, the type of processor. The item "L1 instruction cache" indicates the size of an L1 instruction cache. The item "instruction length" indicates the size per instruction in the object code. If the size varies from one instruction to another, the item "instruction length" indicates the average size. In the following, each index value is converted into an evaluation value using a factor A. The factor A is defined by the following equation: Factor A=L1 Instruction Cache/Instruction Length.

The item "loop count" indicates a conversion method for converting the loop count in the function call index data 164 and the function index data 165 into an evaluation value. For example, if the sum of the loop count of a function call and the loop count of a function called by the function call is N, then 10×A×N is added to the evaluation value of the function call. As the loop count increases, the evaluation value increases, because the execution cost increases and consequently because inline expansion provides greater benefits.

The item "number of source code lines" indicates a conversion method for converting the number of source code lines in the function index data 165 into an evaluation value. For example, if the number of source code lines of a function that is called by a function call is N, then 10×A×N is added to the evaluation value of the function call. The item "number of intermediate code instructions" indicates a conversion method for converting the number of intermediate code instructions in the function index data 165 into an evaluation value. For example, if the number of intermediate code instructions in a function that is called by a function call is N, then 100×A−N is added to the evaluation value of the function call. As the number of instructions decreases, the evaluation value increases, because the relative overhead of the function call increases and consequently because inline expansion provides greater benefits.

The item "innermost loop flag" indicates a conversion method for converting the innermost loop flag in the function call index data 164 into an evaluation value. For example, if the innermost loop flag of a function call is True, then A is added to the evaluation value of the function call. If the innermost loop flag is False, the evaluation value of the function call is not increased. Since optimization of the innermost loop is often very beneficial, the evaluation value of the function call belonging to the innermost loop is increased.

The item "user directive flag" indicates a conversion method for converting the user directive flag in the function index data 165 into an evaluation value. For example, if the user directive flag of a function that is called by a function call is True, then 20×A is added to the evaluation value of the function call. If the user directive flag is False, the evaluation value of the function call is not increased. This is because when there is a directive from the user, inline expansion is often very beneficial.

The item "number of function calls" indicates a conversion method for converting the number of function calls in the function index data 165 into an evaluation value. For example, if the number of function calls (child function call) included in a function that is called by a function call is N, then A×N is subtracted from the evaluation value of the function call. As the number of child function calls increases, the evaluation value decreases, because inline expansion becomes less effective in reducing the number of function calls.

The item "number of non-pipelined instructions" indicates a conversion method for converting the number of non-pipelined instructions in the function call index data 164 and the function index data 165 into an evaluation value. For example, if the sum of the number of non-pipelined instructions of a function call and the number of non-pipelined instructions of a function called by the function call is N, then A×N is subtracted from the evaluation value of the function call. As the number of non-pipelined instructions increases, the evaluation value decreases, because it becomes more difficult to execute instructions in parallel and consequently because it becomes more likely that the performance decreases.

FIG. 13 illustrates an example of an evaluation value table 167.

The analysis unit 141 calculates the evaluation value of each function call based on the function call index data 164, the function index data 165, and the evaluation criteria table 166 described above so as to generate the evaluation value table 167. The evaluation value table 167 is stored in the control information storage unit 143. The evaluation value table 167 includes the following items: function call ID and evaluation value.

The item "function call ID" identifies a function call. The item "evaluation value" indicates an evaluation value calculated for the function call. The analysis unit 141 sorts the function calls #A through #M in descending order of evaluation value, and preferentially select function calls with higher evaluation values as candidates for inline expansion. The analysis unit 141 inlines a selected function call if the number of instructions per function after inline expansion does not exceed a threshold. For example, assume that the evaluation values of the function calls #A through #M are calculated to be 10, 30, 50, 40, 100, 20, 60, 70, 30, 90, 30, 20, and 10, respectively. In this case, the analysis unit 141 selects the function call #E with the highest evaluation value as the first candidate for inline expansion.

When a function call is inlined, the hierarchical structure of function calls changes. Then, the analysis unit 141 updates the function data 163. Further, when a function call is inlined, the index values of one or more functions and the index values of one or more of the other function calls are changed. Then, the analysis unit 141 updates the function call index data 164 and the function index data 165, and recalculates the evaluation values. However, only the index values of the functions and function calls that are affected by the inline expansion need to be changed, and there is no need to update the index values of all the functions and function calls. Further, only the evaluation values of the function calls that are affected by the updated index values need to be recalculated, and there is no need to recalculate all the evaluation values. The analysis unit 141 sorts the function calls by the recalculated evaluation values, and selects the next candidate for inline expansion.

Figure 14:
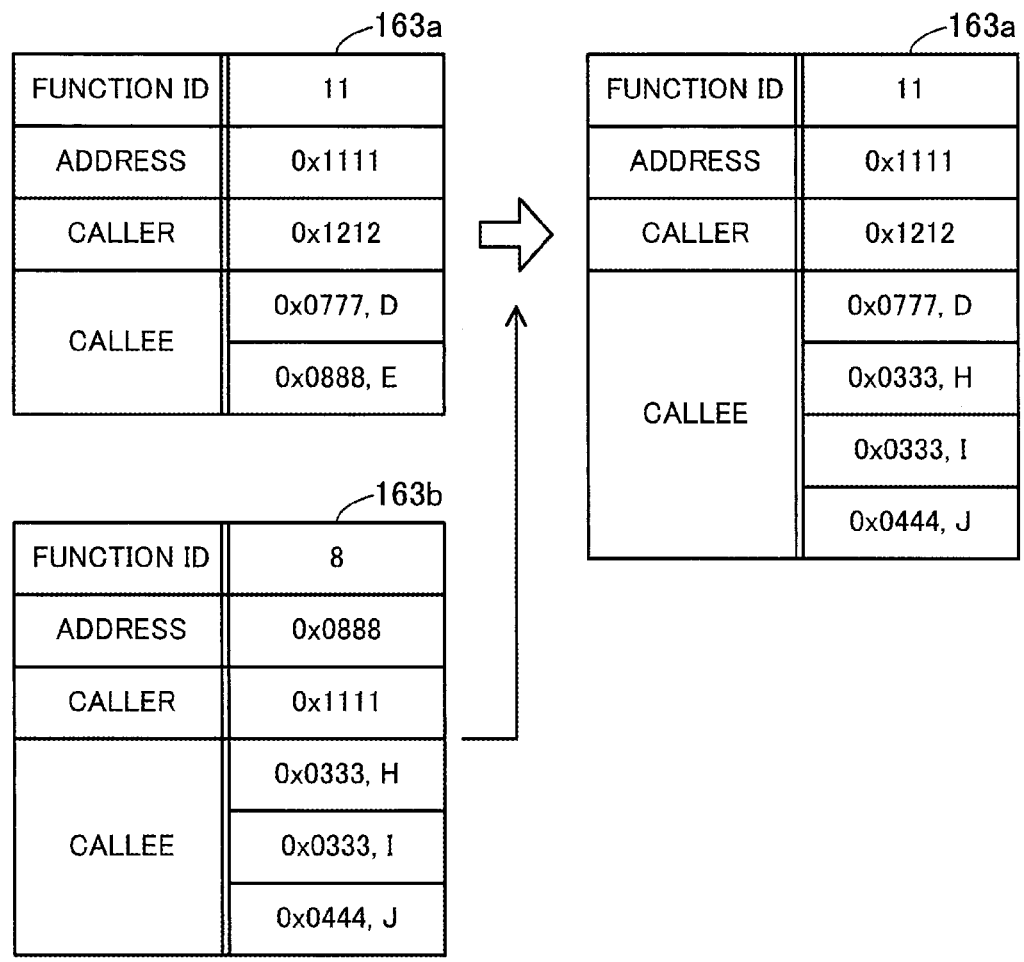
FIG. 14 illustrates an example of function data update.

FIG. 14 illustrates an example of function data update.

A record 163a is a record of the function data 163 corresponding to the function #11. A record 163b is a record of the function data 163 corresponding to the function #8. If the function call #E that calls the function #8 from the function #11 is inlined, the instructions of the function #8 are inserted into the function #11. The function calls #H, #I, and #J included in the function #8 are also inserted into the function #11. Thus, when determining to inline the function call #E, the analysis unit 141 updates the record 163a as illustrated in FIG. 14.

That is, the function ID and the address in the record 163a remain the same. Further, since the function call #C that calls the function #11 is not changed, the caller information in the record 163a remains the same. On the other hand, since the function call #E is eliminated by inline expansion, the function call #E is deleted from the callee information in the record 163a. Further, since the function calls #H, #I, and #J included in the function #8 are taken over to the function #11 by inline expansion, the function calls #J, #I, and #J are added to the callee information in the record 163a. Note that in the case where no caller calling the function #8 exists anymore, the record 163b may be deleted.

Figure 15:
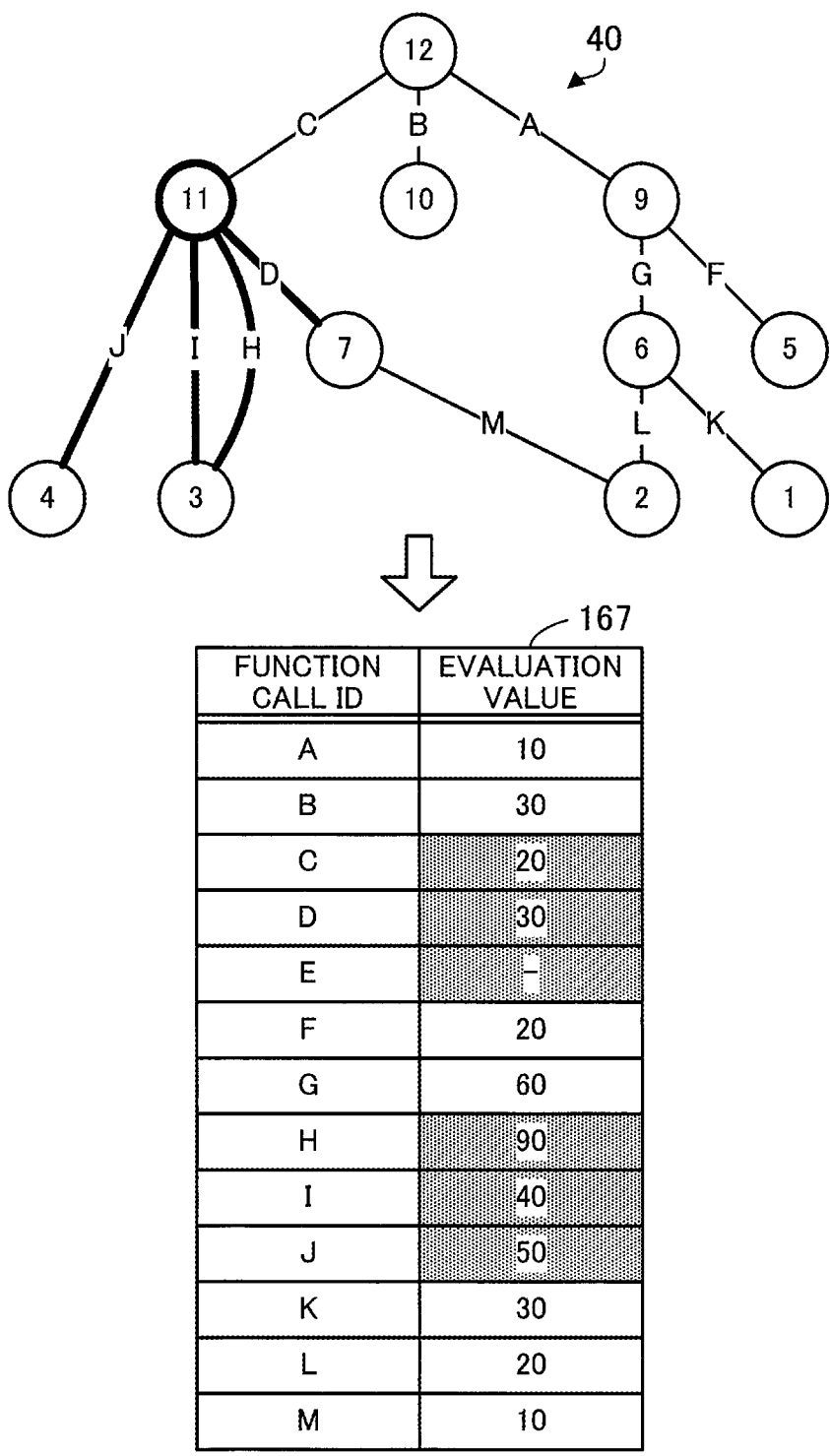
FIG. 15 illustrates an example of evaluation value recalculation.

FIG. 15 illustrates an example of evaluation value recalculation.

In the following, it is assumed that the function call #E is inlined in the function call graph 40. When the function call #E is inlined, the code of the function #11 is changed, so that the index values of the function #11 are changed. Thus, the analysis unit 141 updates a record of the function #11 in the function index data 165. Further, in response to the insertion to the function #11, the surrounding code of the function calls #H, #I, and #J is changed, so that the index values of the function calls #H, #I, and #J are changed. Further, the surrounding code of the function call #D is changed, so that the index values of the function call #D are also changed. Then, the analysis unit 141 updates records of the function calls #D, #H, #I, and #J in the function call index data 164.

Since the index values of the function #11 and the index values of the function calls #D, #H, #I, and #J are changed, the analysis unit 141 recalculates the evaluation values that are affected by the changes. More specifically, since the index values of the function #11 are changed, the analysis unit 141 recalculates the evaluation value of the function call #C that calls the function #11. Further, since the index values of the function calls #D, #H, #I, and #J are changed, the analysis unit 141 recalculates the evaluation values of the function calls #D, #H, #I, and #J. Further, since the function call #E is eliminated, the analysis unit 141 deletes the evaluation value thereof. The function calls #A, #B, #F, #G, #K, #L, and #M are not affected by the inline expansion of the function call #E, and therefore their evaluation values do not need to be recalculated.

As the result, the evaluation values of the function calls #A through #D and #F through #M are calculated to be 10, 30, 20, 30, 20, 60, 90, 40, 50, 30, 20, and 10, respectively. The analysis unit 141 sorts the function calls #A through #D and #F through #M in descending order of evaluation value, and selects the function call #H with the highest evaluation value as the next candidate for inline expansion.

The following describes the procedure of compilation by the compiling apparatus 100.

Figure 16:
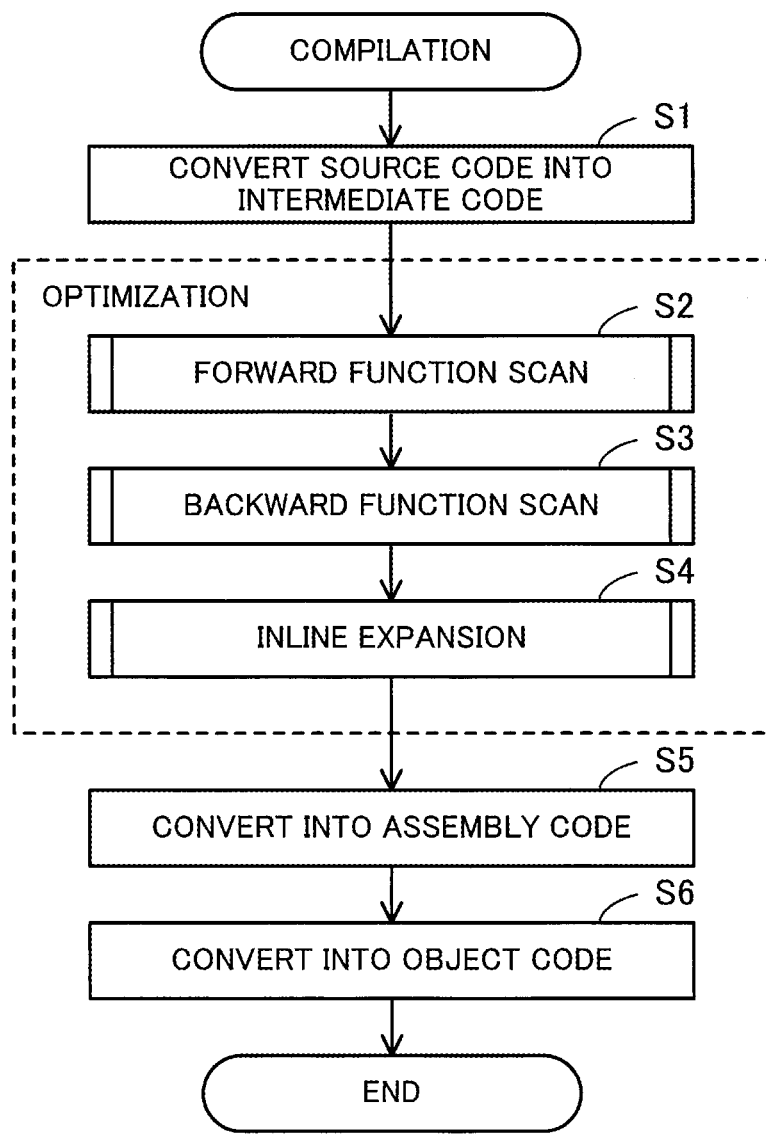
FIG. 16 is a flowchart illustrating an example of the procedure of compilation.

FIG. 16 is a flowchart illustrating an example of the procedure of compilation.

(S1) The intermediate code generation unit 133 reads the source code from the source file 121, and analyzes the source code. The analysis of source code includes lexical analysis, syntactic analysis, and semantic analysis. Then, the intermediate code generation unit 133 converts the source code into intermediate code, and stores the intermediate code in the intermediate code storage unit 134.

(S2) The analysis unit 141 extracts functions from the intermediate code stored in the intermediate code storage unit 134, and scans the functions from the caller to the callee (in the forward direction). In the forward function scan, the analysis unit 141 extracts, for each function call, index values of the function call. The details of the forward function scan will be described below.

(S3) The analysis unit 141 scans the functions extracted in step S2, from the callee to the caller (in the backward direction opposite to that in step S2). In the backward function scan, the analysis unit 141 extracts, for each function, index values of the function. Further, the analysis unit 141 calculates, for each function call, an evaluation value based on the index values of the function call and the index values of the called function. The details of the backward function scan will be described below.

(S4) The analysis unit 141 selects a function call to be inlined, based on the evaluation values calculated in step S3. The optimization execution unit 142 updates the intermediate code stored in the intermediate code storage unit 134 such that the function call selected by the analysis unit 141 is inlined. The details of the inline expansion will be described below.

(S5) The assembly code generation unit 135 convers the optimized intermediate code stored in the intermediate code storage unit 134 into assembly code.

(S6) The file output unit 136 converts the assembly code generated by the assembly code generation unit 135 into object code, and writes the object code to the object file 122.

Figure 17:
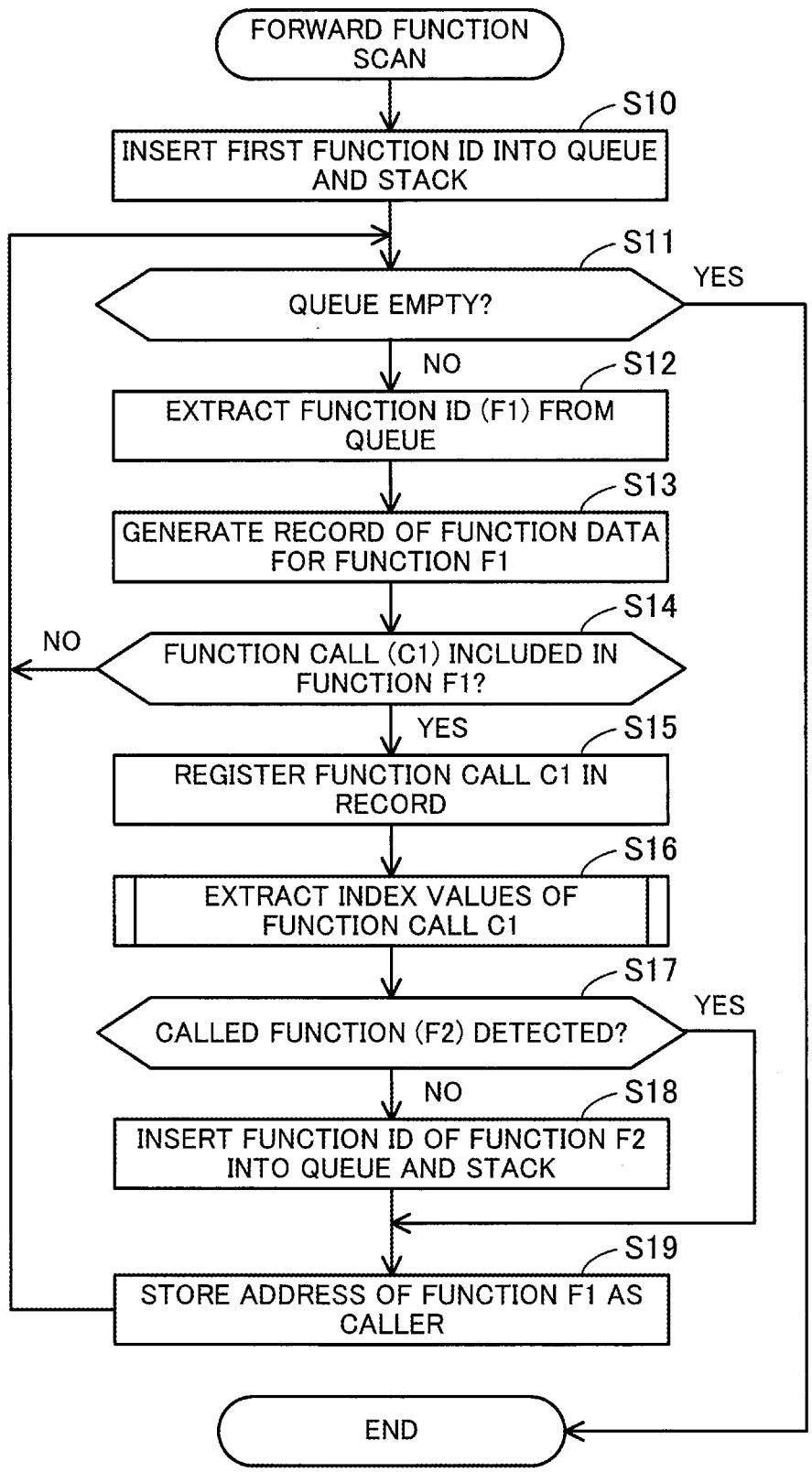
FIG. 17 is a flowchart illustrating an example of the procedure of forward function scan.

FIG. 17 is a flowchart illustrating an example of the procedure of forward function scan.

A forward function scan is executed in step S2 described above.

(S10) The analysis unit 141 detects the first function (for example, a main function) from the intermediate code, and inserts the function ID of the first function into the queue 161 and the stack 162.

(S11) The analysis unit 141 determines whether the queue 161 is empty. If the queue 161 is empty, the forward function scan ends. If the queue 161 is not empty, the process proceeds to step S12.

(S12) The analysis unit 141 extracts a function ID from the queue 161. The function ID to be extracted is one that is inserted first among the function IDs stored in the queue 161. In FIG. 17, a function indicated by the function ID that is extracted in this step is referred to as a function F1.

(S13) The analysis unit 141 generates a record corresponding to the function F1, and adds the record to the function data 163. The function ID in the generated record is identification information assigned to the function F1. The address in the generated record is the start address of the function F1 in the intermediate code.

(S14) The analysis unit 141 refers to the intermediate code, and determines whether the function F1 includes a function call. If the function F1 includes a function call, the process proceeds to step S15. If the function F1 does not include any function call, the process returns to step S11. In the former case, in FIG. 17, the function call included in the function F1 is referred to as a function call C1. Note that in the case where a plurality of function calls are included in the function F1, the operations in steps S15 through S19 (described below) are performed for each of the function calls included in the function F1.

(S15) The analysis unit 141 registers the information on the function call C1 as a callee, in the record generated in step S13. More specifically, the analysis unit 141 registers the address of a function that is called by the function call C1, and the identification information assigned to the function call C1.

(S16) The analysis unit 141 extracts index values for the function call C1, and adds the index values to the function call index data 164. The details of the function call index extraction will be described below.

(S17) The analysis unit 141 determines whether the function that is called by the function call C1 has been detected, that is, whether the function ID of the called function is in the stack 162. If the function ID has been detected, the process proceeds to step S19. If the function ID has not been detected, the process proceeds to step S18. In FIG. 17, the function that is called by the function call C1 is referred to as a function F2.

(S18) The analysis unit 141 inserts the function ID of the function F2 (the function ID of a child function in the function call graph 40) into the queue 161 and the stack 162.

(S19) The analysis unit 141 stores the address of the function F1 as the caller calling the function F2. If a record corresponding to the function F2 is present in the function data 163, the analysis unit 141 registers the address of the function F1 in the record. If a record corresponding to the function F2 is not present in the function data 163, the analysis unit 141 stores the address of the function F1 separately such that when the record is generated, the address of the function F1 is registered in step S13. Then, the process returns to step S11.

Figure 18:
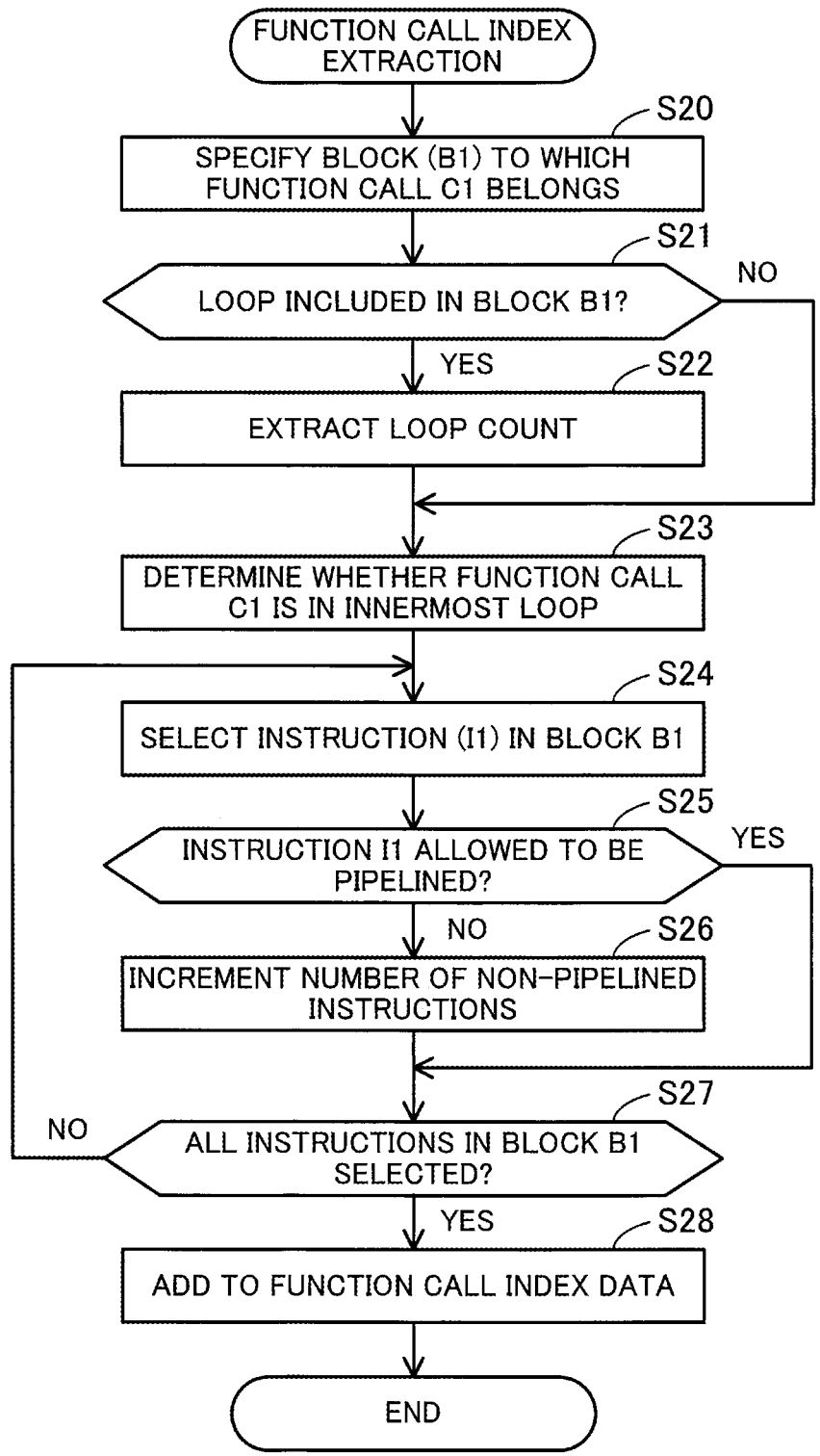
FIG. 18 is a flowchart illustrating the procedure of function call index extraction.

FIG. 18 is a flowchart illustrating the procedure of function call index extraction.

The function call index extraction is executed in step S16 described above.

(S20) The analysis unit 141 specifies a block to which the function call C1 (the function call included in the function F1 in step S14 described above) belongs. A block is a unit of intermediate code representing a set of operations, and is a unit of compilation processing. In FIG. 18, the block specified in this step is referred to as a block B1.

(S21) The analysis unit 141 determines whether the block B1 includes a loop. If a loop is included, the process proceeds to step S22. If no loop is included, the process proceeds to step S23.

(S22) The analysis unit 141 extracts the loop count from the intermediate code.

(S23) The analysis unit 141 determines whether the function call C1 is inside the innermost loop. If the function call C1 does not belong to any loop, the determination is False. If the function call C1 belongs to a loop (a single loop) that is not a multiple loop, the determination is True. If the block B1 includes a multiple loop, and the function call C1 is outside the innermost loop thereof, the determination is False. If the block B1 includes a multiple loop, and the function call C1 is inside the innermost loop thereof, the determination is True.

(S24) The analysis unit 141 selects an instruction in the block B1 in the intermediate code. In FIG. 18, the instruction selected in this step is referred to as an instruction I1.

(S25) The analysis unit 141 determines whether the instruction I1 is allowed to be pipelined. Whether the instruction I1 is allowed to be pipelined depends on the architecture of the processor that executes the instruction. Examples of instructions allowed to be pipelined include arithmetic instructions, logical instructions, memory access instructions, and so on. Examples of instructions not allowed to be pipelined include complex instructions such as SIMD instructions and so on. If the instruction I1 is allowed to be pipelined, the process proceeds to step S27. If not, the process proceeds to step S26.

(S26) The analysis unit 141 increments the number of non-pipelined instructions by 1.

(S27) The analysis unit 141 determines whether all the instructions in the block B1 have been selected in step S24.

If all the instructions in the block B1 have been selected, the process proceeds to step S28. If there is any unselected instruction, the process returns to step S24.

(S28) The analysis unit 141 generates a record corresponding to the function call C1. The analysis unit 141 registers, in the record, the loop count extracted in step S22, the innermost loop flag indicating the determination result of step S23, and the number of non-pipelined instructions that is counted in step S26. The analysis unit 141 adds the record to the function call index data 164.

Figure 19:
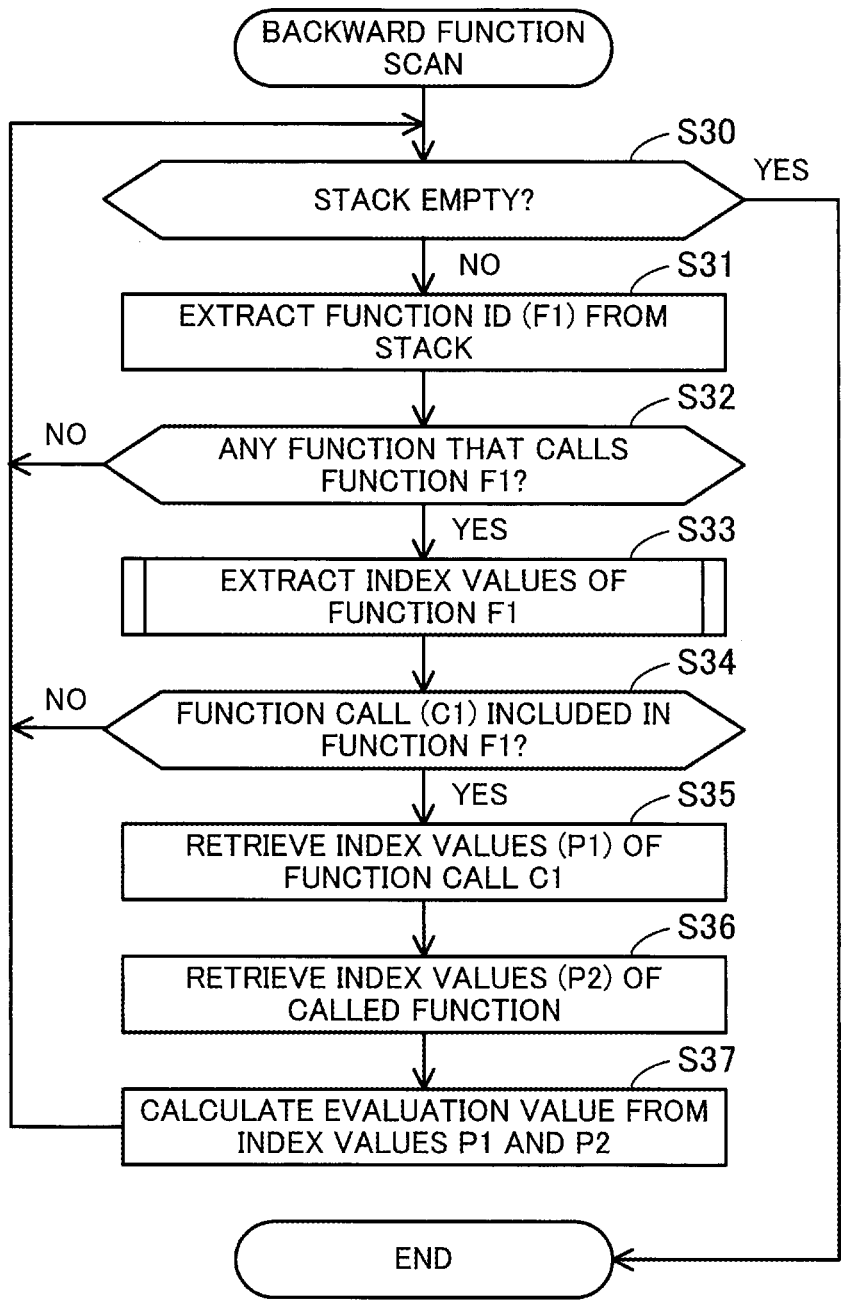
FIG. 19 is a flowchart illustrating an example of the procedure of backward function scan.

FIG. 19 is a flowchart illustrating an example of the procedure of backward function scan.

A backward function scan is executed in step S3 described above.

(S30) The analysis unit 141 determines whether the stack 162 is empty. If the stack 162 is empty, the backward function scan ends. If the stack 162 is not empty, the process proceeds to step S31.

(S31) The analysis unit 141 extracts a function ID from the stack 162. The function ID to be extracted is one that is inserted last among the function IDs stored in the stack 162. In FIG. 19, a function indicated by the function ID that is extracted in this step is referred to as a function F1.

(S32) The analysis unit 141 refers to a record of the function data 163 corresponding to the function F1, and determines whether there is a function that calls the function F1. If there is a function that calls the function F1, the process proceeds to step S33. If not, the process returns to step S30.

(S33) The analysis unit 141 extracts index values for the function F1, and adds the index values to the function index data 165. The details of the function index extraction will be described below.

(S34) The analysis unit 141 refers to the record of the function data 163 corresponding to the function F1, and determines whether the function F1 includes a function call. If the function F1 includes a function call, the process proceeds to step S35. If the function F1 does not include any function call, the process returns to step S30. In the former case, in FIG. 19, the function call included in the function F1 is referred to as a function call C1. Note that in the case where a plurality of function calls are included in the function F1, the operations in steps S35 through S37 (described below) are performed for each of the function calls included in the function F1.

(S35) The analysis unit 141 retrieves index values of the function call C1 from the function call index data 164. The retrieved index values include the loop count, an innermost loop flag, and the number of non-pipelined instructions. In FIG. 19, the retrieved index values are referred to as index values P1.

(S36) The analysis unit 141 specifies a function that is called by the function call C1, and retrieves index values of the called function from the function index data 165. The retrieved index values include the loop count, the number of source code lines, the number of intermediate code instructions, a user directive flag, the number of function calls, and the number of non-pipelined instructions. In FIG. 19, the retrieved index values are referred to as index values P2.

(S37) The analysis unit 141 calculates an evaluation value of the function call C1 from the retrieved index values P1 and P2. That is, the analysis unit 141 converts the retrieved index values P1 and P2 into an evaluation value, based on the evaluation criteria table 166. In the case where a plurality of evaluation criteria tables are stored in the control information storage unit 143, the analysis unit 141 selects an evaluation criteria table corresponding to the architecture of the target processor. The analysis unit 141 registers the calculated evaluation value in the evaluation value table 167. Then, the process returns to step S30.

Figure 20:
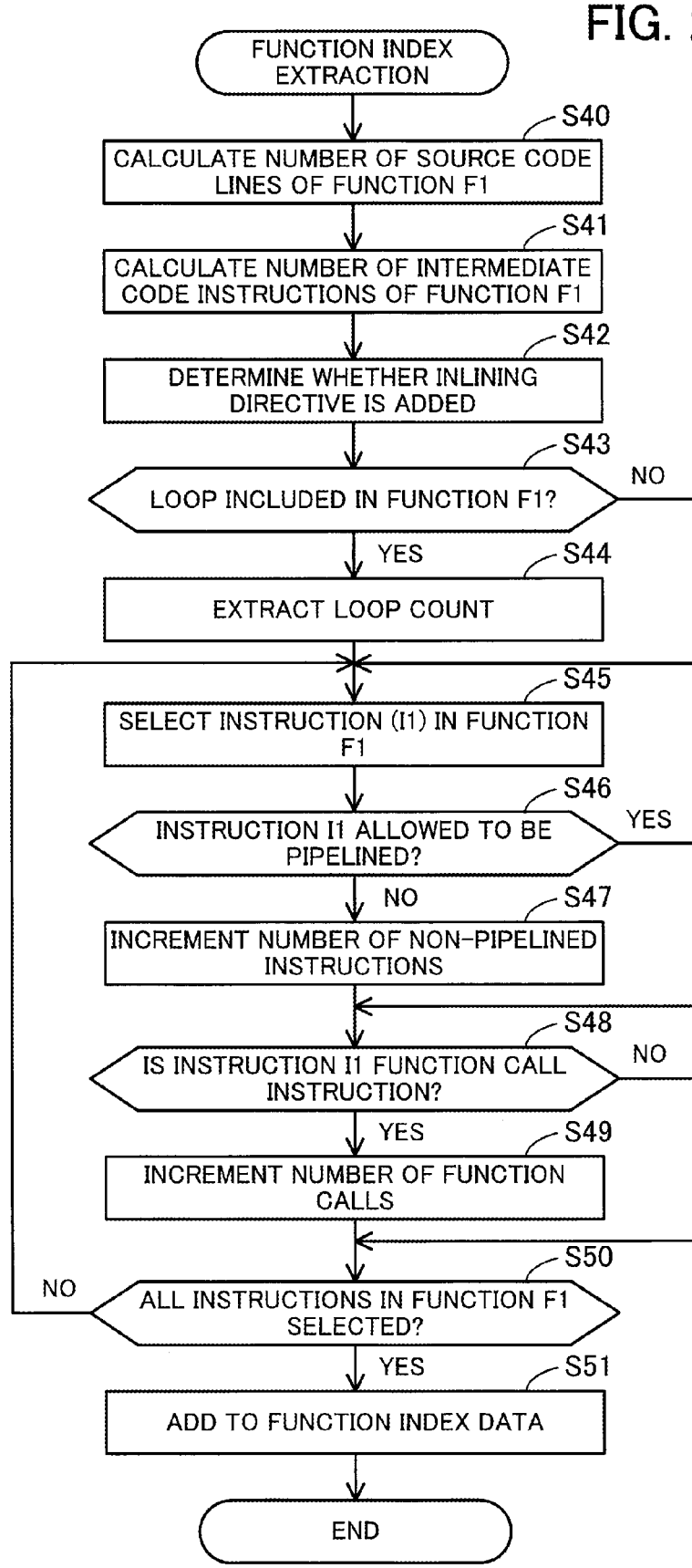
FIG. 20 is a flowchart illustrating an example of the procedure of function index extraction.

FIG. 20 is a flowchart illustrating an example of the procedure of function index extraction.

The function index extraction is executed in step S33 described above.

(S40) The analysis unit 141 retrieves source code of the function F1 (the function in step S31 described above). The analysis unit 141 calculates the number of source code lines of the function F1 by counting the actual statements (lines that end in a semicolon) included in the retrieved source code.

(S41) The analysis unit 141 refers to the record of the function data 163 corresponding to the function F1, and retrieves intermediate code of the function F1. The analysis unit 141 calculates the number of intermediate code instructions of the function F1 by counting the instructions included in the retrieved intermediate code.

(S42) The analysis unit 141 determines whether an inlining directive (additional information provided for control purposes and indicating inline expansion) is added to the source of code of the function F1.

(S43) The analysis unit 141 determines whether the function F1 includes a loop. If a loop is included, the process proceeds to step S44. If no loop is included, the process proceeds to step S45.

(S44) The analysis unit 141 extracts the loop count from the intermediate code.

(S45) The analysis unit 141 selects an instruction in the function F1 in the intermediate code. In FIG. 20, the instruction selected in this step is referred to as an instruction I1.

(S46) The analysis unit 141 determines whether the instruction I1 is allowed to be pipelined. If the instruction I1 is allowed to be pipelined, the process proceeds to step S48. If not, the process proceeds to step S47.

(S47) The analysis unit 141 increments the number of non-pipelined instructions by 1.

(S48) The analysis unit 141 determines whether the instruction I1 is a function call instruction (corresponding to the "callpe" instruction in FIG. 11). If the instruction I1 is a function call instruction, the process proceeds to step S49. If not, the process proceeds to step S50.

(S49) The analysis unit 141 increments the number of function calls by 1.

(S50) The analysis unit 141 determines whether all the instructions in the function F1 have been selected in step S45. If all the instructions in the function F1 have been selected, the process proceeds to step S51. If there is any unselected instruction, the process returns to step S45.

(S51) The analysis unit 141 generates a record corresponding to the function F1. The analysis unit 141 registers, in the record, the loop count extracted in step S44, the number of source code lines and the number of intermediate code instructions calculated in steps S40 and S41, and the user directive flag indicating the determination result of step S42. Further, the analysis unit 141 registers, in the record, the number of function calls counted in step S40 and the number of non-pipelined instructions counted in step S47. The analysis unit 141 adds the record to the function index data 165.

Figure 21:
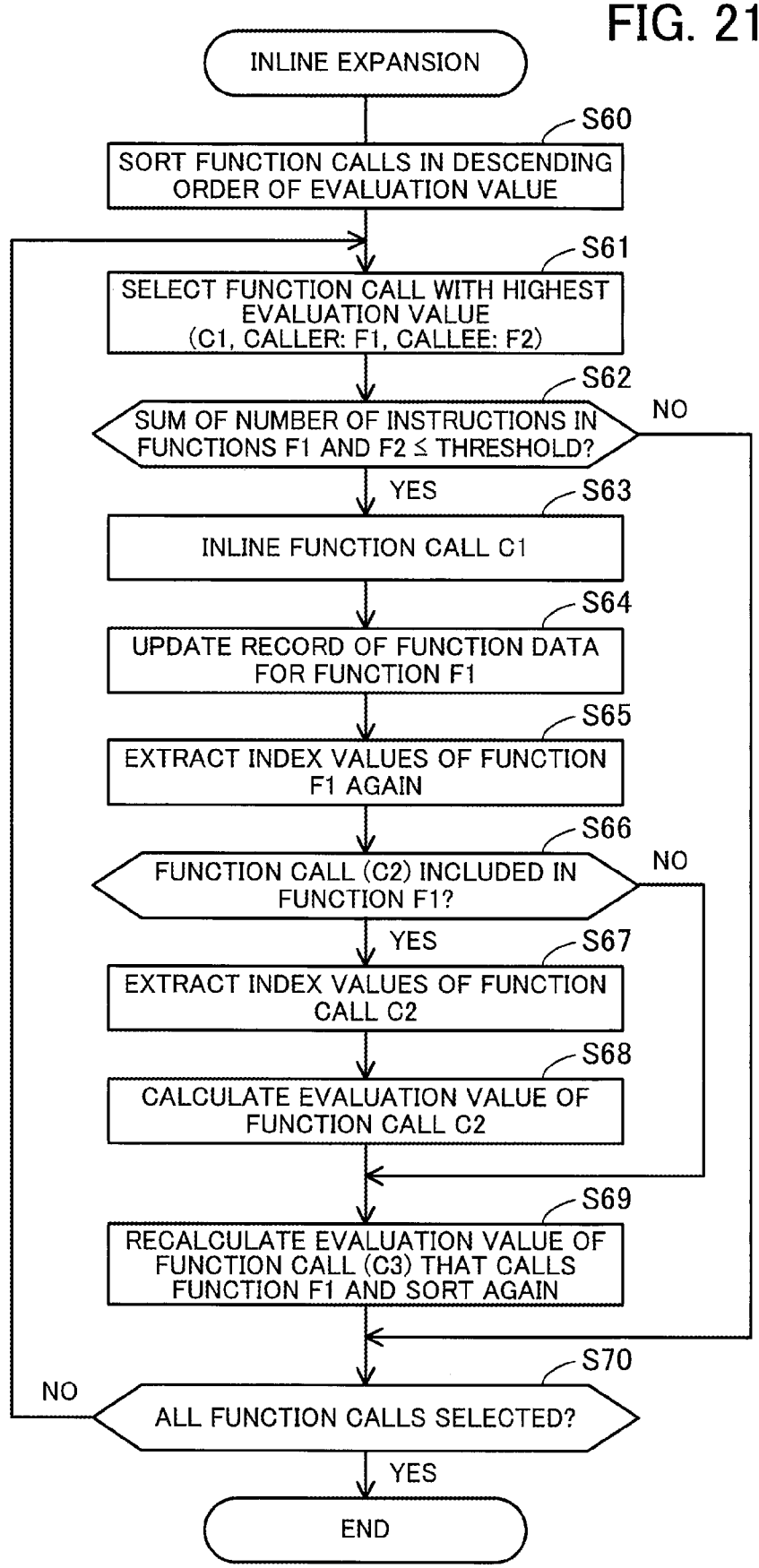
FIG. 21 illustrates an example of the procedure of inline expansion.

FIG. 21 illustrates an example of the procedure of inline expansion.

The inline expansion is executed in step S4 described above.

(S60) The analysis unit 141 sorts the function calls in descending order of evaluation value, based on the evaluation value table 167 storing the calculated evaluation values.

(S61) The analysis unit 141 selects the function call with the highest evaluation value, from the unselected function calls. However, function calls having been inlined are excluded. Further, the state of having been selected is cancelled when the function calls that are not inlined are sorted again in step S69 (described below). In FIG. 21, the function call selected in this step is referred to as a function call C1; a function that calls the function call C1 is referred to as a function F1; and a function that is called by the function call C1 is referred to as a function F2.

(S62) The analysis unit 141 determines whether the sum of the number of instructions in the function F1 and the number of instructions in the function F2 is equal to or less than a threshold. The number of instructions in the function F1 and the number of instructions in the function F2 may be specified by referring to records of the function index data 165 corresponding to the functions F1 and F2. The threshold is set to, for example, the Number of Instructions that L1 Instruction Cache Is Capable of Storing=Size of L1 Instruction Cache/Instruction Length. If the sum of the number of instructions is less than the threshold, the process proceeds to step S63. If not, the process proceeds to step S70.

(S63) The analysis unit 141 determines to inline the function call C1. The optimization execution unit 142 makes an update to the intermediate code stored in the intermediate code storage unit 134 so as to inline the function call C1 in accordance with the determination by the analysis unit 141.

(S64) The analysis unit 141 updates the record of the function data 163 corresponding to the function F1. That is, the analysis unit 141 deletes information (address and function call ID) on the function call C1 from the record corresponding to the function F1. Further, the analysis unit 141 registers, in the record corresponding to the function F1, information on a function call included in the function F2.

(S65) The analysis unit 141 extracts index values for the function F1 again, based on the intermediate code of the updated function F1. The index values that are extracted again include the loop count, the number of source code lines, the number of intermediate code instructions, a user directive flag, the number of function calls, and the number of non-pipelined instructions. The analysis unit 141 updates the record of the function index data 165 corresponding to the function F1.

(S66) The analysis unit 141 refers to the record of the function data 163 corresponding to the function F1 that is updated in step S64, and determines whether the function F1 includes a function call. If the function F1 includes a function call, the process proceeds to step S67. If the function F1 does not include any function call, the process returns to step S69. In the former case, in FIG. 21, the function call included in the function F1 is referred to as a function call C2. Note that in the case where a plurality of function calls are included in the function F1, the operations in steps S67 and S68 (described below) are performed for each of the function calls.

(S67) The analysis unit 141 extracts index values for the function call C2, based on the updated intermediate code of the function F1. The extracted index values include the loop count, an innermost loop flag, and the number of non-pipelined instructions. The analysis unit 141 updates a record of the function call index data 164 corresponding to the function call C2.

(S68) The analysis unit 141 retrieves the index values of the function call C2 from the function call index data 164.

Further, the analysis unit 141 retrieves index values of the called function from the function index data 165. The analysis unit 141 calculates an evaluation value of the function call C2, based on the retrieved index values and the evaluation criteria table 166. The analysis unit 141 updates the evaluation value of the function call C2 in the evaluation value table 167.

(S69) The analysis unit 141 refers to the function data 163, and detects a function call that calls the function F1. In FIG. 21, the function call detected in this step is referred to as a function call C3. The analysis unit 141 retrieves index values of the function call C3 from the function call index data 164. Further, the analysis unit 141 retrieves the index values of the function F1 from the function index data 165. The analysis unit 141 recalculates the evaluation value of the function call C3, based on the retrieved index values and the evaluation criteria table 166. The analysis unit 141 updates the evaluation value of the function call C3 in the evaluation value table 167. Then, the analysis unit 141 sorts again the function calls in descending order of evaluation value, based on the evaluation value table 167.

(S70) The analysis unit 141 determines whether all the selectable function calls have been selected in step S61. If all the function calls have been selected, the inline expansion ends. If there is any unselected function call, the process returns to step S61.

According to the compiling apparatus 100 of the second embodiment, the loop count, an innermost loop flag, and the number of non-pipelined instructions are extracted from the code of each calling function. Further, the loop count, the number of source code lines, the number of intermediate code instructions, a user directive flag, the number of function calls, and the number of non-pipelined instructions are extracted from the code of each called function. Then, an evaluation value of each function call is calculated based on these index values, and function calls with higher evaluation values are preferentially inlined. Thus, it is possible to preferentially select function calls whose inline expansion provides greater benefits. Accordingly, it is possible to improve the performance of the object code, compared to the case of using a method that selects function calls sequentially from the top of the code or a method that selects function calls sequentially from the bottom of the hierarchical structure.

Further, since it suffices to calculate an evaluation value for each function call, it is possible to reduce the processing load of compiler optimization and reduce the compilation time, compared to the case of using a method that evaluates the effect of inline expansion for each and every combination of function calls. Further, since it suffices to scan the code of functions only twice, one in the forward direction and the other in the backward direction, it is possible to prevent an increase in processing load due to inline expansion being performed as a way of compiler optimization.

As mentioned above, the information processing in the first embodiment may be implemented by causing the information processing apparatus 10 to execute a program. Further, the information processing in the second embodiment may be implemented by causing the compiling apparatus 100 to execute a program.

The program may be recorded in a computer-readable storage medium (for example, the storage medium 113). Examples of storage media include magnetic disks, optical discs, magneto-optical disks, semiconductor memories, and the like. Magnetic disks include FD and HDD. Optical discs include CD, CD-Recordable (CD-R), CD-Rewritable (CD-RW), DVD, DVD-R, and DVD-RW. The program may be stored in a portable storage medium and distributed. In this case, the program may be copied (installed) from the portable storage medium to another storage medium such as an HDD or the like (for example, the HDD 103) so as to be executed.

According to one aspect, it is possible to inline appropriate function calls in terms of performance.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An information processing apparatus comprising:
a memory configured to store code including a plurality of functions and a plurality of function calls, each of the plurality of function calls calling one of the plurality of functions; and
a processor configured to perform a procedure including:
calculating, for each of the plurality of functions included in the code, a plurality of index values including a first index value and a second index value, the first index value indicating an iteration status of a loop in the function, the second index value indicating a code size of the function, wherein the iteration status of the loop in the function indicates a loop count and the code size of the function indicates a number of lines of the function;
calculating, for each of the plurality of function calls included in the code, an evaluation value based on the plurality of index values that are calculated for the function called by the function call, wherein the calculated evaluation value is proportional to the sum of the plurality of index values;
selecting a function call from the plurality of function calls, based on the evaluation value, wherein the function call with the highest evaluation value is selected, and inlining the selected function call; and
converting the inlined function call into object code.

2. The information processing apparatus according to claim 1, wherein the calculating the plurality of index values includes calculating the plurality of index values further including at least one of a third index value, a fourth index value, and a fifth index value, the third index value indicating whether additional information that indicates inline expansion of the function is added, the fourth index value indicating a number of other function calls included in the function, the fifth index value indicating a number of instructions that are not pipelined among instructions included in the function.

3. The information processing apparatus according to claim 1, wherein:
the procedure further includes calculating, for each of the plurality of function calls, another index value, indicating an iteration status of a loop to which the function call belongs; and
the calculating the evaluation value includes calculating the evaluation value based on the other index value calculated for the function call, in addition to the plurality of index values that are calculated for the function called by the function call.

4. The information processing apparatus according to claim 1, wherein the procedure further includes:
upon inlining a first function call included in one function of the plurality of functions,
updating the plurality of index values for the one function;
updating the evaluation value for a second function call that calls the one function; and
selecting a next function call to be inlined, based on the updated evaluation value.

5. A compiling method comprising:
calculating, by a processor, for each of a plurality of functions, a plurality of index values including a first index value and a second index value, the first index value indicating an iteration status of a loop in the function, the second index value indicating a code size of the function, wherein the iteration status of the loop in the function indicates a loop count and the code size of the function indicates a number of lines of the function;
calculating, by the processor, for each of a plurality of function calls each calling one of the plurality of functions, an evaluation value based on the plurality of index values that are calculated for the function called by the function call, wherein the calculated evaluation value is proportional to the sum of the plurality of index values;
selecting, by the processor, a function call from the plurality of function calls, based on the evaluation value, wherein the function call with the highest evaluation value is selected, and inlining the selected function call; and
converting the inlined function call into object code.

6. A non-transitory computer-readable storage medium storing a computer program that causes a computer to execute a process comprising:
calculating, for each of a plurality of functions, a plurality of index values including a first index value and a second index the first index value indicating an iteration status of a in the function, the second index value indicating a code size of the function, wherein the iteration status of the loop in the function indicates a loop count and the code size of the function indicates a number of lines of the function;
calculating, for each of a plurality of function calls each calling one of the plurality of functions, an evaluation value based on the plurality of index values that are calculated for the function called by the function call, wherein the calculated evaluation value is proportional to the sum of the plurality of index values;
selecting a function call from the plurality of function calls, based on the evaluation value, wherein the function call with the highest evaluation value is selected, and inlining the selected function call; and
converting the inlined function call into object code.

* * * * *